(12) United States Patent
Kim

(10) Patent No.: US 11,972,167 B2
(45) Date of Patent: Apr. 30, 2024

(54) DEVICE, SYSTEM, AND METHOD FOR VIDEO SHOOTING IN VIRTUAL PRODUCTION

(71) Applicant: VIVE STUDIOS CO., LTD, Seoul (KR)

(72) Inventor: Sung Su Kim, Seongnam-si (KR)

(73) Assignee: Vive Studios Co., Ltd, Seoul (KR)

( * ) Notice: Subject to any disclaimer, the term of this patent is extended or adjusted under 35 U.S.C. 154(b) by 0 days.

(21) Appl. No.: 17/638,159

(22) PCT Filed: Nov. 8, 2021

(86) PCT No.: PCT/KR2021/016139
§ 371 (c)(1),
(2) Date: Feb. 24, 2022

(87) PCT Pub. No.: WO2023/017911
PCT Pub. Date: Feb. 16, 2023

(65) Prior Publication Data
US 2024/0053943 A1 Feb. 15, 2024

(30) Foreign Application Priority Data
Aug. 13, 2021 (KR) .................. 10-2021-0107231

(51) Int. Cl.
*G06F 3/14* (2006.01)
*G06T 19/00* (2011.01)
(Continued)

(52) U.S. Cl.
CPC .......... *G06F 3/1446* (2013.01); *G06T 19/006* (2013.01); *G09G 3/32* (2013.01); *H04N 5/76* (2013.01)

(58) Field of Classification Search
CPC ........ H04N 21/43; H04N 21/81; H04N 5/222; H04N 5/265; H04N 5/272; H04N 5/76; G06F 3/1446; G09G 3/32; G06T 19/006
See application file for complete search history.

(56) References Cited

U.S. PATENT DOCUMENTS 8,004,565 B2 * 8/2011 Herz ..................... G06T 7/246
348/169
8,718,438 B2 * 5/2014 Hio ........................ H04N 5/262
386/210
(Continued)

FOREIGN PATENT DOCUMENTS

JP 1995-336728 A 12/1995
JP 2006-47478 A 2/2006
(Continued)

OTHER PUBLICATIONS

Samsung Newsroom, "Samsung to Build First Virtual Production Studio with CJ ENM Leveraging Leading Display Technology," Jul. 26, 2021, 8 pages (5 pages of translation), published in Korea.
(Continued)

*Primary Examiner* — Dmitriy Bolotin
(74) *Attorney, Agent, or Firm* — Knobbe, Martens, Olson, & Bear, LLP

(57) ABSTRACT

A device for video shooting in virtual production is provided. The device is a control device for video shooting in virtual production, in which a person or object located in front of a light-emitting diode (LED) wall is shot by a camera in a state in which at least one medium of media such as an image, a video, and a camera tracking linked video is displayed in front of the LED wall. The device includes: a display; and at least one processor configured to execute a program for controlling video shooting in virtual production and display a user interface of the program on the display.

20 Claims, 19 Drawing Sheets

(51) Int. Cl.
    *G09G 3/32*     (2016.01)
    *H04N 5/76*     (2006.01)

(56) References Cited

U.S. PATENT DOCUMENTS

| | | | |
|---|---|---|---|
| 11,425,283 B1* | 8/2022 | Thurston, III | G06T 7/13 |
| 2008/0118178 A1* | 5/2008 | Way | G06F 3/1446 |
| | | | 345/1.3 |
| 2021/0241486 A1* | 8/2021 | Gimpelson | G06F 16/957 |
| 2021/0272334 A1* | 9/2021 | Momcilvic | G06T 7/50 |
| 2021/0304418 A1* | 9/2021 | Soon-Shiong | G06F 16/70 |
| 2024/0053943 A1* | 2/2024 | Kim | H04N 21/43 |

FOREIGN PATENT DOCUMENTS

| | | |
|---|---|---|
| KR | 10-0901111 B1 | 6/2009 |
| KR | 10-2015-0114016 A | 10/2015 |
| KR | 10-2018-0052496 A | 5/2018 |
| KR | 10-2020-0142385 A | 12/2020 |
| KR | 10-2218843 B1 | 2/2021 |
| KR | 10-2243673 B1 | 4/2021 |

OTHER PUBLICATIONS

International Search Report in PCT Application No. PCT/KR2021/016139 dated Mar. 17, 2022 in 4 pages.

* cited by examiner

| 조명(Light) | 안개(Fog) | 번개(Lightning) | 바람(Fan) | INTERACTION #1 | INTERACTION #2 |
|---|---|---|---|---|---|
| DAYLIGHT MODE (STRONG) | OFF | OFF | FIRST STAGE | OFF | OFF |
| DAYLIGHT MODE (WEAK) | FIRST STAGE | OFF | SECOND STAGE | FIRST STAGE | OFF |
| DAYLIGHT MODE (WEAK) | SECOND STAGE | ON | THIRD STAGE | SECOND STAGE | THUNDER SOUND |
| SunMood_1 | | | | | |
| CloudMood_1 | | | | | |
| CloudMood_2 | | | | | |

DEVICE, SYSTEM, AND METHOD FOR VIDEO SHOOTING IN VIRTUAL PRODUCTION

TECHNICAL FIELD

The present invention relates to a video shooting technique, and more particularly, to a technique for integrally controlling various shooting elements in virtual production-based video shooting.

BACKGROUND ART

Recently, as the movement of people between countries and gatherings of people are restricted due to coronavirus disease 2019 (COVID-19), there is a growing interest in virtual reality-based non-face-to-face technology. In accordance with such a trend, attempts are also increasing to introduce virtual production technology in the field of video production such as broadcasting, film, performance, and the like.

In this case, virtual production is a video shooting technology that enables instant visualization and image synthesis based on real-time graphics rendering and camera tracking technology, and the virtual production is a technology that can improve the efficiency and quality of the video production process. For example, the virtual production may be used as a concept of visualizing graphics reflecting movement of a camera at the video shooting site in various forms and synthesizing the visualized graphics with an actual video of the camera in real time.

Such virtual production is mainly performed indoors so that it is possible to reduce constraints such as shooting space, time, weather, etc., and complex elements may be shot simultaneously so that it is possible to reduce the time for post-production of video production, and thus there is an advantage in that the productivity of video production can be improved.

However, despite the above advantage, the virtual production has several difficulties in practical introduction and use. That is, since the virtual production is a convergence technology that combines several complex technologies, it is necessary for video producers who use the virtual production to have a broad understanding of various technologies related to video production.

In particular, as compared to the conventional video production site, in the case of a virtual production shooting site (i.e., virtual production studio), complexity increases and it is more difficult to comprehensively control various types of devices. Further, the conventional virtual production solution mainly focuses on real-time synthesis of videos, and thus it is difficult to integrally control the overall shooting or to expand additional functions.

DISCLOSURE

Technical Task

The present invention is directed to providing a technique related to virtual production that can be easily operated even by a user who lacks the knowledge required for virtual production by providing a user interface that allows easy, intuitive, and integrated control of a plurality of complex shooting elements at a virtual production shooting site.

The present invention is also directed to providing a technique related to virtual production that enables synchronization between various types of media and interaction control for specific media based on time-series control.

The present invention is also directed to providing a technique related to virtual production in which not only control over different media but also control over a plurality of special effect devices to generate an external environment is provided integrally.

The present invention is also directed to providing a technique related to virtual production in which multiple commands that need to be simultaneously executed at a specific time point are unified into a single command group and called in a time series or arbitrary action.

However, objects to be solved by the present invention are not limited to the above-described objects and other objects that are not described may be clearly understood by those of ordinary skill in the art to which the present invention pertains from the following descriptions.

Technical Solution

One aspect of the present invention provides a control device, which is a control device for video shooting in virtual production, in which a person or object located in front of a light-emitting diode (LED) wall is shot by a camera in a state in which at least one medium of media such as an image, a video, and a camera tracking linked video is displayed in front of the LED wall, including a display, and at least one processor configured to execute a program for controlling video shooting in virtual production and display a user interface of the program on the display.

The program may include a plurality of connection object units which are each dedicated to connection with a corresponding one of a plurality of external players that play different media, and a setting unit, which includes a plurality of first timelines which are divided for each external player and displayed in the form of time-series layers on the user interface, a first control setting unit for time-series control setting for each external player on the first timeline according to a user's input, and a second control setting unit for selectively interworking between a key point and the connection object unit on the first timeline or for control setting of a detailed state or mode of the connection object unit.

The at least one processor may transmit information on the control setting and a current playback time of the first timeline to the corresponding external player through the dedicated connection object unit and control time-series operations of the plurality of external players in which the control setting and the current playback time are reflected.

The control setting of the first control setting unit may include color adjustment setting or weather condition setting for the medium played in any player at any time point on the first timeline according to the user's input.

The plurality of players may include individual players that segment the medium displayed on the LED wall into n sections (where n is a natural number greater than or equal to two) and play the medium according to a control signal.

The second control setting unit may be allowed to perform control setting for correcting position, angle, and lens information on the section played by each player.

The control signal may include a control value for visualizing a frustum, which is a portion included in a lens of a real camera, at a higher resolution than another region by projecting a position, an angle of view, and a focal length of the real camera onto a virtual camera.

The control value may include a check value indicating whether the player is connected, a key value of data of a lens connected to the player, a position value and direction value of a fixed camera, and a correction value of tracking data.

The setting unit may include the n first timelines for each of the n players that segment the medium into the n sections and play the medium.

The at least one processor may synchronize and play the media of then sections played according to the time of the n first timelines.

The plurality of players may further include a player that synthesizes or expands augmented reality (AR) interlocked according to camera tracking with a video shot by the corresponding camera.

The plurality of connection object units may each be provided to be dedicated to connection with a corresponding one of a plurality of external special effect devices supporting external environmental factors.

The setting unit may further include second timelines displayed in the form of time-series layers on the user interface so as to perform call setting at any time point for a first task, which is a command for controlling an operation of any special effect device, according to the user's input.

The at least one processor may transmit the call setting to the corresponding special effect device through the dedicated connection object unit and control an operation of the first task at the corresponding time point.

The special effect device may include at least one of a light device, a lightning device, a sound device, a wind device, a fog machine, a snow machine, and a rain machine.

The setting unit may be allowed to perform call setting of a second task, which is a command for controlling an operation of any player, at any time point on the second timeline according to the user's input.

The at least one processor may transmit the call setting of the second task to the corresponding player through the dedicated connection object unit and control an operation of the second task at the corresponding time point.

The setting unit may be allowed to perform call setting of a task bundle at any time point on the second timeline according to the user's input.

The task bundle may be a command for simultaneously calling a plurality of tasks selected from among the first and second tasks.

The task bundle may be a first task bundle, which is provided by default in various types, or a second task bundle, which is newly defined by selecting a combination of the first and second tasks from among the first and second tasks by the user.

The first and second task bundles may be displayed on the user interface according to the different second timelines.

When the task bundle is executed, whether the execution has been completed may be separately displayed on the user interface.

The setting unit may further include an annotation unit in which a speech bubble containing situation information for any time point on the first timeline or the second timeline is displayed on a portion of the user interface which indicates the corresponding time point.

The user interface may display a list of annotations containing information on the annotation unit.

When information on any one annotation unit is selected from the list of annotations, a playback target point in the setting unit may be moved to a time point of the corresponding annotation unit.

The first task may include a move command for moving the playback target point in the setting unit to any time point.

When a unique identification (ID) of any one annotation unit is referred to when the move command is called, the playback target point in the setting unit may be moved to a time point indicated by the annotation unit of the corresponding unique ID.

Another aspect of the present invention provides a system, which is a system for video shooting in virtual production, including an LED wall on which at least one medium of media such as an image, a video, and a camera tracking linked video is displayed in front thereof, a camera configured to shoot a person or object located in front of the LED wall in a state in which the at least one medium is displayed on the LED wall, and a control device configured to control playback of the medium.

The control device may execute a program for controlling video shooting in virtual production and control a user interface of the program to be displayed on a display.

The control device may transmit the control setting to the corresponding player through the dedicated connection object unit and control time-series operations of the plurality of players according to the control setting.

Still another aspect of the present invention provides a method, which is a method performed in a device for video shooting in virtual production, in which a person or object located in front of an LED wall is shot by a camera in a state in which at least one medium of media such as an image, a video, and a camera tracking linked video is displayed in front of the LED wall, including setting a plurality of connection object units which are each dedicated to connection with a corresponding one of a plurality of external players that play different media, performing control setting for time-series control setting for each external player on the first timeline according to a user's input on a plurality of first timelines which are divided for each external player and displayed in the form of time-series layers on a user interface and performing control setting for selectively interworking between a key point and the connection object unit on the first timeline or control setting of a detailed state or mode of the connection object unit, and transmitting information on the control setting and a current playback time of the first timeline to the corresponding player through the dedicated connection object unit and controlling time-series operations of the plurality of players in which the control setting and the current playback time are reflected.

Yet another aspect of the present invention provides a recoding medium, which is a recoding medium that is executed by at least one processor and records a program for the at least one processor to execute the above-described method.

Advantageous Effects

According to the present invention configured as described above, a virtual production control technique that can be easily operated even by a user who lacks the knowledge required for virtual production by providing a user interface that allows easy, intuitive, and integrated control of a plurality of complex shooting elements at a virtual production shooting site can be provided.

In particular, according to the present invention, various types of devices such as a special effect device and a video synthesis program device as well as a plurality of players playing media can be controlled more easily, intuitively, and integrally based on a timeline.

Further, according to the present invention, synchronization between various types of media and interaction control for specific media is possible based on time-series control.

Further, according to the present invention, not only control over different media but also control over a plurality of special effect devices to generate an external environment can be provided integrally.

Further, according to the present invention, multiple commands that need to be simultaneously executed at a specific time point can be unified into a single command group and called in a time series or arbitrary action, and thus integrated control of various media and special effect devices can be easily performed.

Effects obtainable in the present invention are not limited to the above-described effects and other effects that are not described may be clearly understood by those of ordinary skill in the art to which the present invention pertains from the following descriptions.

EMBODIMENTS

Figure 1:
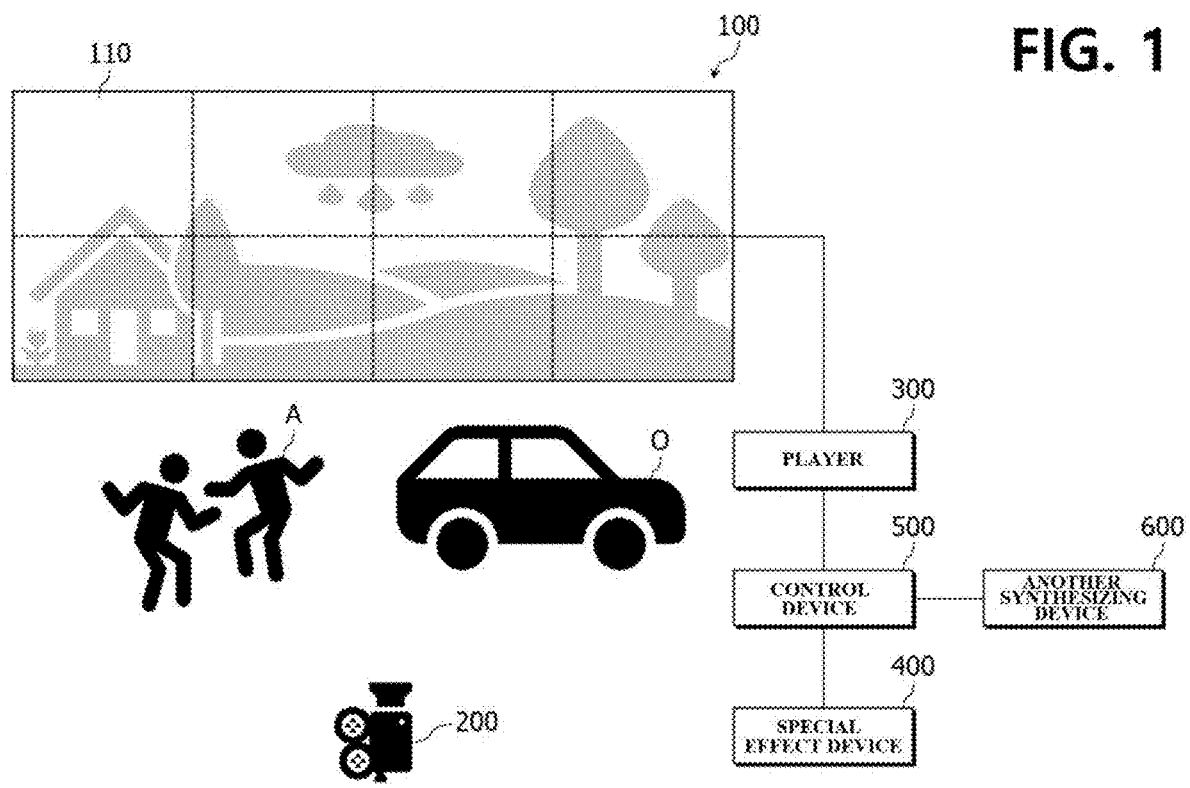
FIG. 1 illustrates a schematic conceptual diagram of a system (10) according to an embodiment of the present invention.

The above objects, solutions, and effects of the present invention will become more apparent from the following detailed descriptions in relation to the accompanying drawings. Accordingly, those skilled in the art to which the present invention pertains can easily implement the technical scope of the present invention. In addition, when embodiments of the present invention are described and when it is determined that detailed descriptions of known technology related to the present invention unnecessarily obscure the subject matter of the present invention, detailed descriptions thereof will be omitted.

Terms used in this specification are considered in a descriptive sense only and not for purposes of limitation. In this specification, the singular forms include the plural forms unless the context clearly indicates otherwise. It will be understood that the terms "include," "including," "comprise," and/or "comprising" when used herein, specify some stated components, but do not preclude the presence or addition of one or more other components.

In this specification, expressions such as "or" and "at least one" may indicate one of words listed together or a combination of two or more words. For example, "A or B" and "at least one of A and B" may include only one of A or B and may include both A and B.

In this specification, the description according to "for example" and the like may not exactly match the pieces of information presented, such as the recited properties, variables, or values. Embodiments of the present invention according to various embodiments of the present invention should not be limited by effects such as variations, including tolerances, measurement errors, limits of measurement accuracy, and other commonly known factors.

In this specification, it should be understood that when an element is referred to as being "connected" or "coupled" to another element, the element may be directly connected or coupled to another element or intervening elements may be present. In contrast, when an element is referred to as being "directly connected" or "directly coupled" to another element, there are no intervening elements present.

In this specification, it should be understood that when an element is referred to as being disposed "on" or "in contact with" another element, the element may be in direct contact with or directly connected to another element or an intervening element may be present. Conversely, it should be understood that when an element is referred to as being disposed directly "on" or "in direct contact with" another element, there are no elements present. Other expressions describing the relationship between elements, for example, "between," "directly between," etc. may be interpreted similarly.

In this specification, it should be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Unless otherwise defined, all terms (including technical and scientific terms) used herein have the same meaning as commonly understood by one of ordinary skill in the art to which the present invention belongs. Also, it should be further understood that terms, such as those defined in commonly used dictionaries, should not be interpreted in an idealized or overly formal sense unless expressly so defined herein.

Hereinafter, an exemplary embodiment of the present invention will be described in detail with reference to the accompanying drawings.

Figure 2:
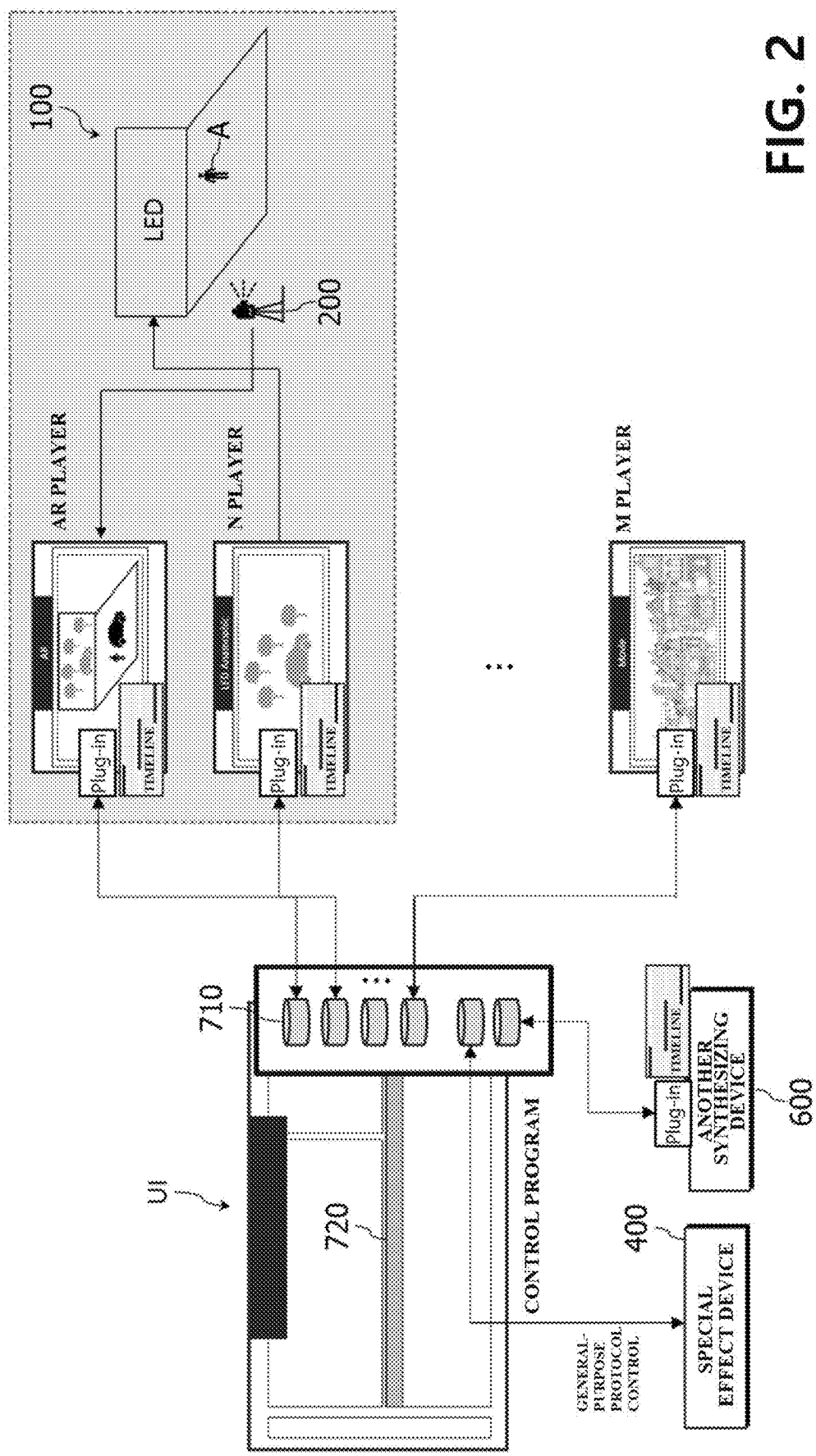
FIG. 2 illustrates a schematic conceptual diagram of a control operation performed by a control program.

FIG. 1 illustrates a schematic conceptual diagram of a system 10 according to an embodiment of the present invention, and FIG. 2 illustrates a schematic conceptual diagram of a control operation performed by a control program.

The system 10 according to the embodiment of the present invention is a system for video shooting in virtual production.

Virtual production is a technique that utilizes real-time graphics to help overcome various inefficient factors or limitations on a video production pipeline and is used as a fairly broad concept. Recently, the virtual production is mainly used as a concept of visualizing graphics reflecting movement of a camera on a light-emitting diode (LED) wall or in the form of augmented reality (AR) and synthesizing the visualized graphics with an actual video in real time. Further, the virtual production may be referred to as several other terms such as AR, virtual reality (VR), extended reality (XR), and the like according to the type of technology. Therefore, first, the virtual production technology will be described from three different perspectives in order to understand the composition of the technology and its main application fields.

1. Perspective of Video Production Stage

Real-time graphics rendering technology, generally called a game engine, has recently been evolving enough to show quality at a level of an actual video. Such instant and high-quality visualization technology may be used for different purposes at various points in a video production pipeline divided into a pre-planning stage, a production stage, and a post-production stage.

First, in the pre-planning stage, a game engine may be actively used for story visualization (Pre Vis) or space/equipment simulation (Tech Vis). That is, in the planning stage, not only the development of content but also a space, camera movement, cut editing, etc. are implemented in advance, and various issues (e.g., set size, movement path, lens angle of view, etc.) are checked in advance. In particular, recently, the scope of application of VR technology is increasing, such as editing components in a virtual environment through VR Scouting technique or holding a virtual camera to simulate shooting with respect to movies.

Next, in the production stage, the virtual production technology is used so that computer graphics (CG) synthesis, which has been performed in the post-production stage, is performed at the same time as shooting and the synthesized video is transmitted live or the burden of synthesizing in the post-production stage is reduced. To this end, an XR solution that synthesizes actual videos and CG in real time is used together with tracking equipment that detects camera movement. Here, video synthesis programs such as Pixotope and the like are mainly used.

Finally, in the post-production stage, state data (e.g., camera tracking, content timeline, options, etc.) generated during the shooting may be utilized. By using the state data, additional effects or CG elements may be generated even after the shooting is completed, and scenes that need correction may be corrected more rapidly.

2. Perspective of CG Synthesis Method

The core of the virtual production technology is a visualization function of synchronizing a real space and a virtual space to synthesize the CG and the actual video in real time without any sense of difference or display the synchronized spaces on LEDs. Therefore, the terms, VR, AR, and XR, are sometimes used depending on a type of CG synthesis.

First, the VR refers to real-time spatial synthesis based on a chroma key studio. For example, in order to simultaneously show a person and a virtual space in the third person, a VR-type virtual production technology may be used. That is, it is possible to obtain the same effect as if shooting is directly performed in VR through a camera that can perform real-time tracking. The reason such directing is possible is that the video, in which the virtual space is synthesized, is generated in real time and provided to a director of photography and a director so that immediate determination and response are possible.

As opposed to the VR, the AR refers to a method of adding specific graphics on top of an actual video and has recently been widely used in events such as broadcasting, performance, product launching shows, and the like. In particular, due to advances in rendering technologies such as Realtime Ray Tracing and DLSS, the CG quality of the game engine gradually approaches the level of actual video, and thus attempts to express scenes that are physically difficult to implement or costly productions with AR graphics are increasing. For example, special productions are possible, such as a new car coming out of the floor, a new building being generated, and the like, by adding AR elements to a video with only one car in an actual stage space.

The XR has been used in earnest mainly for non-face-to-face events since 2020. Unlike the AR or VR, the XR synthesizes both of far and near views with CG to enable expression as if the user is completely in a virtual space. To this end, an LED wall is placed in the background to output a distant scene, and AR graphics are added in front of a subject to express a sense of space. Further, it is possible to express the outside of the physical boundary of the LED wall as if the user is in an infinite space by extending the outside with CG. As compared to chroma key-based shooting, the LED wall-based shooting allows for natural color expression of the subject and has less restrictions on space lighting production.

3. Perspective of Purpose of Use

The AR, VR, and XR technologies may be used in various fields such as broadcasting, performance, movies, and the like. Although the virtual production technology is similar to the XR technology, there is a difference in its approach when used in event-oriented shooting such as broadcasting, performance, and the like, and dramatic video shooting such as movies, dramas, and the like.

First, in event shooting, the virtual production technology is mainly used to rapidly generate fresh visual effects or obtain synthesized videos on the spot without additional post-production. Such videos are either broadcast live or consumed rapidly after a short editing period. Therefore, although the tolerance for content quality or technical limitations is relatively wide, the demand level for camera movement speed and video latency are high. On the other hand, in the production of dramatic videos such as movies, the quality of the final video together with faithful support for professional shooting techniques are further focused on. For example, in event shooting such as performance, it is acceptable to see the LED elements on the LED wall or to see the moiré effect (interference between the grid of the camera CCD and the grid of the LED element), but, in movies, it is absolutely not allowed. Further, when looking closely at the expression of expanding and filling the external area of the LED wall in real time, there is a slight gap and color difference, and thus the expression is mainly used only for event shooting. In the case of cameras, B4-mount broadcast cameras and zoom lenses are used in the former, but large CCD cinema cameras and prime lenses are mainly used in the latter.

Meanwhile, an In-Camera VFX technology, which is one of virtual production technologies, refers to a method of mapping CG reflecting camera movement on a large LED wall space and shooting various scenes by moving a shooting point or changing a space state. There are parts similar to XR shooting in performances, but the devices are configured in a form that focuses more on natural space lighting and reflections on the basis of a larger, high-spec LED wall. Further, an integrated control interface that can instantly change shooting conditions such as time zone, atmosphere state, and shooting position or control a reflective LED wall, a car gimbal, and the like is required.

The system 10 for video shooting in the virtual production may include an LED wall 100, a camera 200, a player 300, a special effect device 400, and a control device 500, as illustrated in FIG. 1. Further, a synthesizing device 600 in which another synthesizing program is executed may be additionally included.

That is, various media (i.e., videos) played through the player 300 are displayed in front of the LED wall 100, and in the state in which the media are displayed in front of the LED wall 100, a person A or an object O, which is located in front of the LED wall 100, is shot with the camera 200. Of course, an external environmental factor according to the special effect device 400 may be added as necessary during the shooting of the camera 200. In this case, the player 300 and the special effect device 400 may be controlled through the control device 500, and thus the video shooting in the virtual production may be performed more smoothly.

Specifically, the LED wall 100 is a huge display device that displays the media played by the player 300 in front thereof in an LED manner and has a wall shape upright on the floor. Of course, the LED wall 100 may include walls of different angles through which media are displayed at different angles or include walls through which media are displayed upward from the bottom, but the present invention is not limited thereto.

In this case, the LED wall 100 includes sub-unit displays 110 segmented into n sections (where n is a natural number greater than or equal to two). That is, the LED wall 100 implements one large display through the sub-unit displays 110. In this case, the LED wall 100 may display various media according to a type of the player 300. That is, the medium played by the player 300 which is selected by the control device 500 from among a plurality of players 300 may be displayed through the LED wall 100.

For example, at least one medium of media such as an image, a video, and a camera tracking linked video may be displayed through the LED wall 100.

In this case, the camera tracking linked video is a video whose content is changed by reflecting the position and movement of the camera 200. That is, when the camera 200 is moved from a first position to a second position, the camera tracking linked video is a video in which the type, position, or angle of the content in the video is changed by reflecting the change in corresponding position. To this end, a tracking device for checking the movement and position of the camera 200 transmits tracking information to the player 300 that plays the camera tracking linked video, and the corresponding player 300 plays a linked video based on the received tracking information. For example, the camera tracking linked video may be media produced by an unreal engine, but the present invention is not limited thereto.

Meanwhile, the image and the video refer to a general still image or moving picture, respectively, except for the above-described camera tracking linked video.

The camera 200 is a device for shooting the person A or the object O which is located in front of the LED wall 100. In particular, the position and movement of the camera 200 may be checked by the tracking device. The tracking information may be transmitted to the player 300 that plays the camera tracking linked video, and the corresponding player 300 may play a linked video or a background image based on the received tracking information.

The player 300 is an electronic device capable of computing, and plays pre-stored media, and a plurality of players 300 may be provided. In this case, the players 300 in charge of playing a medium may be provided for each type of medium. The players 300 may include a first player connected to the LED wall 100 so that the played media is displayed on the LED wall 100, and a second player in which the played media is not displayed on the LED wall 100.

For example, the electronic device may include a desktop personal computer (PC), a laptop PC, a tablet PC, a netbook computer, a workstation, a smartphone, a smart pad, a mobile phone, a media playback device, or the like, but the present invention is not limited thereto.

For example, the first player may play an image, a video, or a camera tracking linked video. Of course, one first player may be implemented to play one type of medium, but the present invention is not limited thereto, and one first player may be implemented to selectively play multiple types of media.

Referring to FIG. 2, a first player that plays a camera tracking linked video may be referred to as an "N player," and a first player that plays an image or video may be referred to as an "M player."

The first player may be provided to play a medium by taking charge of each of n sub-unit displays of the LED wall 100. In particular, in the case of the N player, since there is a large amount of data according to the camera tracking linked video, n N players that play the segmented camera tracking linked videos by taking charge of each sub-unit display may be provided. In this case, it is essential to synchronize the camera tracking linked videos of the N players. To this end, in the present invention, by managing each player based on a timeline through a control program to be described below, the synchronization may be controlled more easily, intuitively and integrally.

That is, the N player is a player that segments the virtual space video displayed on the LEDs into n sections and plays the segmented virtual space video. Therefore, the n N players are executed in each of n renderable electronic devices (servers), and each N player communicates with the control program in real time and transmits or receives control signals. However, in the case of the N player, a method of simply segmenting and displaying a large image on a large screen may not be used. For example, for In-Camera VFX shooting, the N player may project the position, angle of view, and focal length of a real camera 200 to a virtual camera without change to visualize a region (frustum) included in a lens of the real camera 200 at a higher resolution than another region, and reflect and distort a shape of the LED wall 100. Accordingly, it is possible to display the virtual space within the LED wall 100 as if it is a real three-dimensional space when viewed from the gaze of the viewfinder of the camera 200. In this way, the function of segmenting and distorting the video may simultaneously and integrally control the n N players through the control program. To this end, the control signals that the respective N players transmit or receive to or from the control program may include the following signals.

1) A keepalive signal for checking whether the control program is connected to the N player
2) A frustum size, aperture value, motion blur value, and the like of the N player
3) Color adjustment and atmospheric state (sky, sun, or cloud) change values (key point setting value)

4) Lens data (angle of view and focus position)
5) A task bundle-based interaction call signal
6) Shooting position and direction values in the virtual space that can be changed through a Stage window
7) Position and direction values of a fixed camera in Free Cam mode
8) A tracking data correction value (six-axis data)

Meanwhile, the second player is a player that generates AR and synthesizes or expands the video shot by the camera 200. In particular, the second player may synthesize the camera tracking linked AR with the video shot by the camera 200. Such a second player may be referred to as an "AR player."

In this case, the camera tracking linked AR is an AR video whose content is changed by reflecting the position and movement of the camera 200. That is, when the camera 200 is moved from the first position to the second position, the type, position, or angle of the content of the AR may be changed by reflecting the change in the corresponding position. To this end, the video shot by the camera 200 and the tracking information of the tracking device for checking the movement and position of the camera 200 are transmitted to the AR player, and the corresponding AR player may synthesize the linked AR based on the received tracking information with the received video shot by the camera 200. For example, the AR video may be a medium produced by an unreal engine, but the present invention is not limited thereto.

Figure 19:
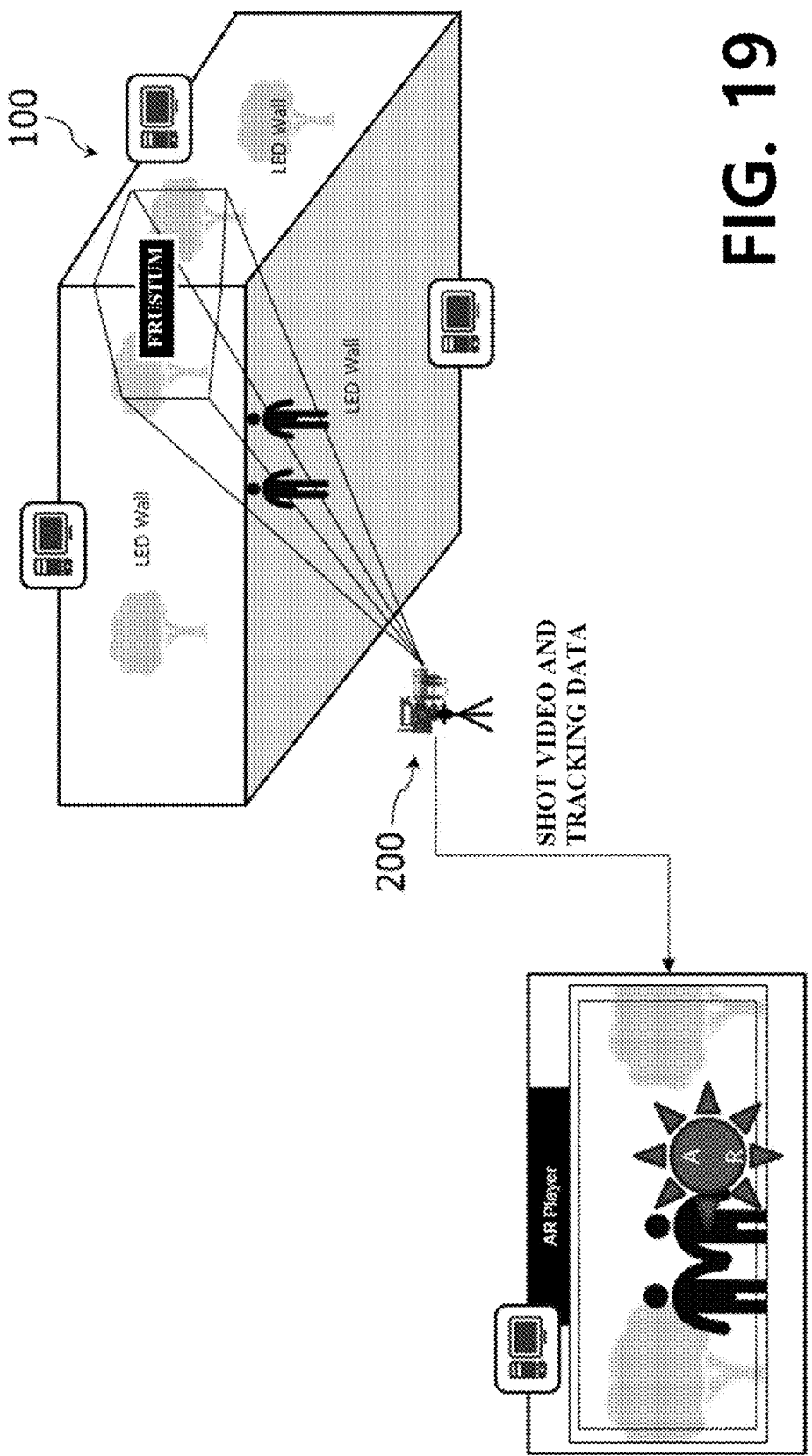
FIG. 19 illustrates an example of virtual production using an augmented reality (AR) player.

FIG. 19 illustrates an example of virtual production using an AR player.

That is, the AR player operates by simultaneously receiving the tracking information and the video shot by the camera, generating real-time rendering CG on the basis of the actual movement of the camera, and synthesizing the actual video with a virtual object. In this case, in order to perform XR production by also using the N player, real-time data (e.g., position, angle, and lens information) generated from the same tracking device may be used simultaneously by the N player and the AR player. In this case, a background image of the LED wall 100 is expressed as if an object is in the corresponding space according to the gaze of the camera 200, and it is possible to produce a completely three-dimensional XR with an AR object overlaid thereon. That is, the virtual background and the foreground are visualized at the same time, and the subject is positioned between the virtual background and the foreground.

The special effect device 400 is a device that supports external environmental factors. That is, the external environmental factors are factors related to external environmental effects such as light, weather, and the like. In this case, the external environmental effect may be a lighting effect, a lightning effect, a sound effect, a wind effect, a fog effect, a snow effect, or a rain effect. The external environmental factor imparts an external environmental effect to the medium displayed on the LED wall 100 so that the reality of the video shot by the camera 200 may be further improved. To this end, the special effect device 400 may include at least one of a light device (lighting), a lightning device, a sound device, a wind device, a fog machine, a snow machine, and a rain machine, and a plurality of special effect devices 400 may be provided to impart different external environmental effects. For example, the special effect device 400 may be provided to directly or indirectly impart the external environmental effect to the person A or the object O which is located at the periphery of the LED wall 100, in particular, in front of the LED wall 100.

The synthesizing device 600 is a device in which another video synthesizing program such as Pixotope, Disguise, or the like for synthesizing videos is executed. The synthesizing device 600 may be used for additional video synthesis with respect to the video shot by the camera 200 as necessary.

The control device 500 is a device that controls video shooting in virtual production. That is, the control device 500 controls the player 300 and the special effect device 400 during the video shooting in the virtual production.

For example, the control device 500 selects a first player for playing the media to be displayed on the LED wall 100, and controls the playback of the corresponding media for the selected first player. Of course, the control device 500 may control the operation of a second player so that AR synthesis of the video shot in the state in which the medium is displayed on the LED wall 100 by the first player is performed.

Further, the control device 500 may select at least one special effect device 400 from among the corresponding media displayed on the LED wall 100 according to the playback by the selected first player and control the operation thereof. Of course, it is also possible to control the operation of the corresponding special effect device 400 together with the AR synthesis by the second player.

Figure 3:
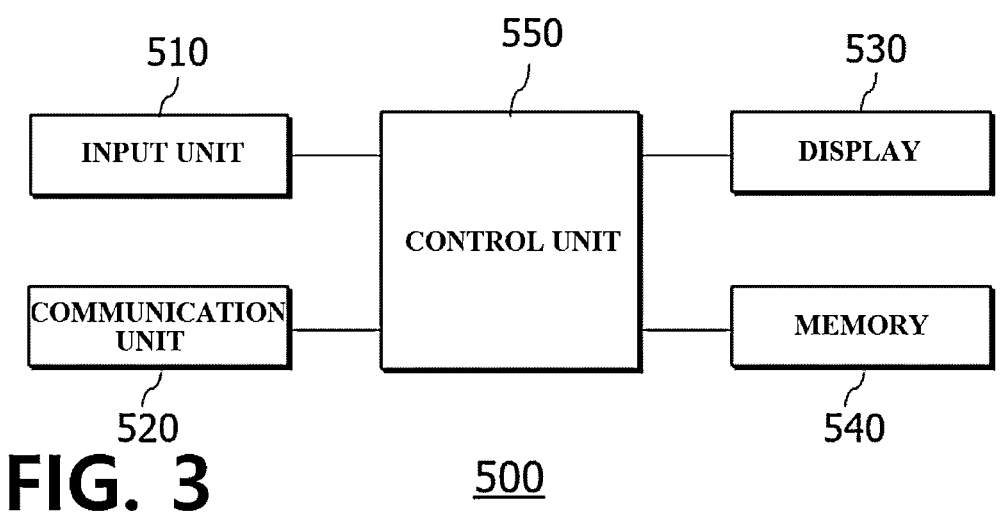
FIG. 3 illustrates a block diagram of a control device (500).

FIG. 3 illustrates a block diagram of the control device 500.

The control device 500 is an electronic device capable of computing and executes a program (hereinafter, referred to as a "control program") for controlling video shooting in virtual production. The control device 500 may include an input unit 510, a communication unit 520, a display 530, a memory 540, and a control unit 550, as illustrated in FIG. 3.

For example, the electronic device may include a desktop PC, a laptop PC, a tablet PC, a netbook computer, a workstation, a smartphone, a smart pad, a mobile phone, or the like, but the present invention is not limited thereto.

The input unit 510 generates input data in response to various user's inputs, and may include various input devices. For example, input data input through a user interface (UI) of the control program may be generated, and the corresponding input data may be transmitted to the control unit 550.

For example, the input unit 510 may include a key board, a key pad, a dome switch, a touch panel, a touch key, a touch pad, a mouse, a menu button, or the like, but the present invention is not limited thereto.

The communication unit 520 is configured to communicate with other devices such as the player 300, the special effect device 400, the synthesizing device 600, the terminal, the server, and the like. For example, the communication unit 520 may transmit control information set through the UI of the control program to the selected first player, second player, or special effect device 400. Further, the communication unit 520 may receive control information set in the terminal or server. Further, the communication unit 520 may receive video information of the first player, the second player, or the synthesizing device 600 being played, or may receive status information on the special effect device 400 in operation.

For example, the communication unit 520 may perform wireless communication such as $5^{th}$ generation (5G) communication, long term evolution-advanced (LTE-A), long term evolution (LTE), Bluetooth, Bluetooth low energy (BLE), near field communication (NFC), Wi-Fi communication, or the like, or perform wired communication such as cable communication or the like, but the present invention is not limited thereto.

The display 530 displays various pieces of video data on a screen and may be configured as a non-emission panel or a light-emitting panel. For example, the display 530 may display the UI of the control program. Further, the display 530 may display video information of the first player or second player being played, display video information of the synthesizing device 600, and display status information of the special effect device 400 in operation.

For example, the display 530 may include a liquid crystal display (LCD), an LED display, an organic LED (OLED) display, a micro electro mechanical systems (MEMS) display, an electronic paper display, or the like, but the present invention is not limited thereto. Further, the display 530 may be implemented as a touch screen or the like integrated with the input unit 510.

The memory 540 is configured to store various types of information necessary for the operation of the control device 500. For example, the information stored in the memory 540 may include the control information set through the UI of the control program, the terminal, or the server, the video information of the first player or second player being played, the video information of the synthesizing device 600, the status information of the special effect device 400 in operation, information on the control program, information related to a control method to be described below, or the like, but the present invention is not limited thereto.

For example, the memory 540 may include a hard disk type, a magnetic media type, a compact disc read only memory (CD-ROM) type, an optical media type, a magneto-optical media type, a multimedia card micro type, a flash memory type, a read only memory (ROM) type, a random access memory (RAM) type, or the like according to its type, but the present invention is not limited thereto. Further, the memory 540 may be a cache, a buffer, a main memory device, or an auxiliary memory according to its purpose/position, or may be a separately provided storage system, but the present invention is not limited thereto.

The control unit 550 may perform various control operations of the control device 500. That is, the control unit 550 may control the execution of the control program stored in the memory 540 and the control method to be described below, and control the operation of the remaining components of the control device 100, that is, the operation of the input unit 510, the communication unit 520, the display 530, and the memory 540.

For example, the control unit 550 may include at least one processor that is hardware and may include a process or the like that is software executed in the corresponding processor, but the present invention is not limited thereto.

Figure 4:
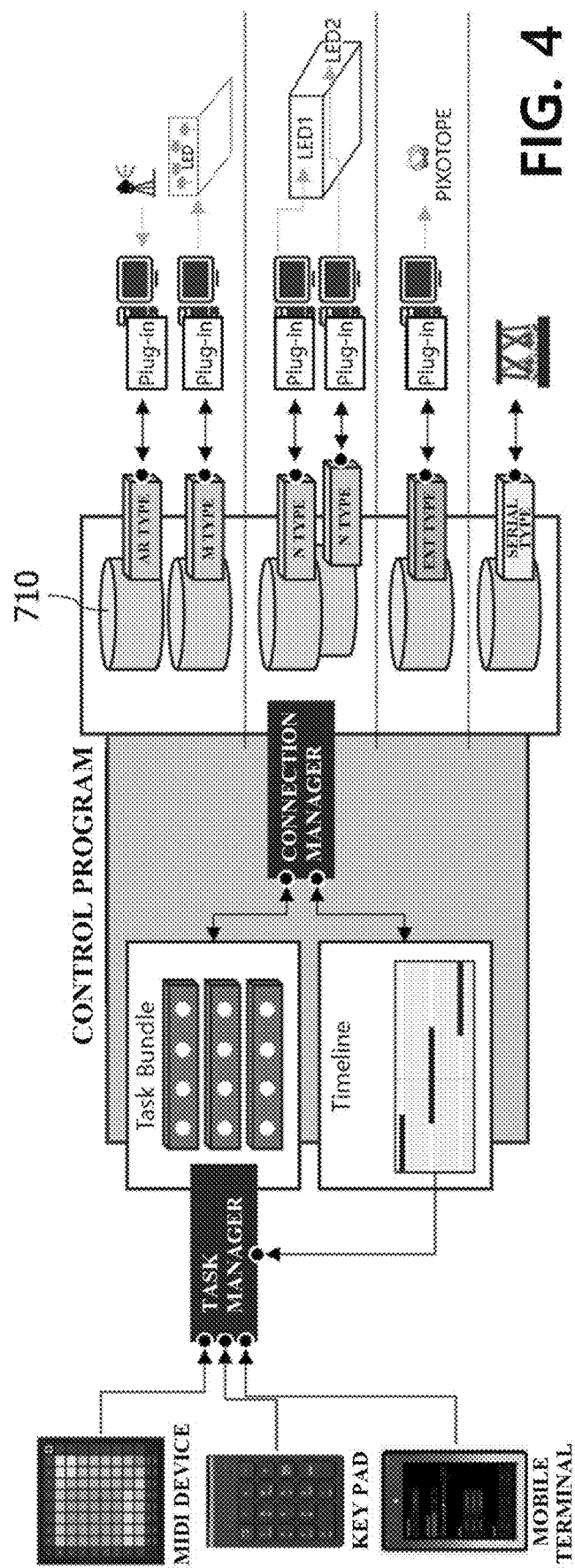
FIG. 4 illustrates an example of a schematic configuration diagram of an operation of a control program.
Figure 5:
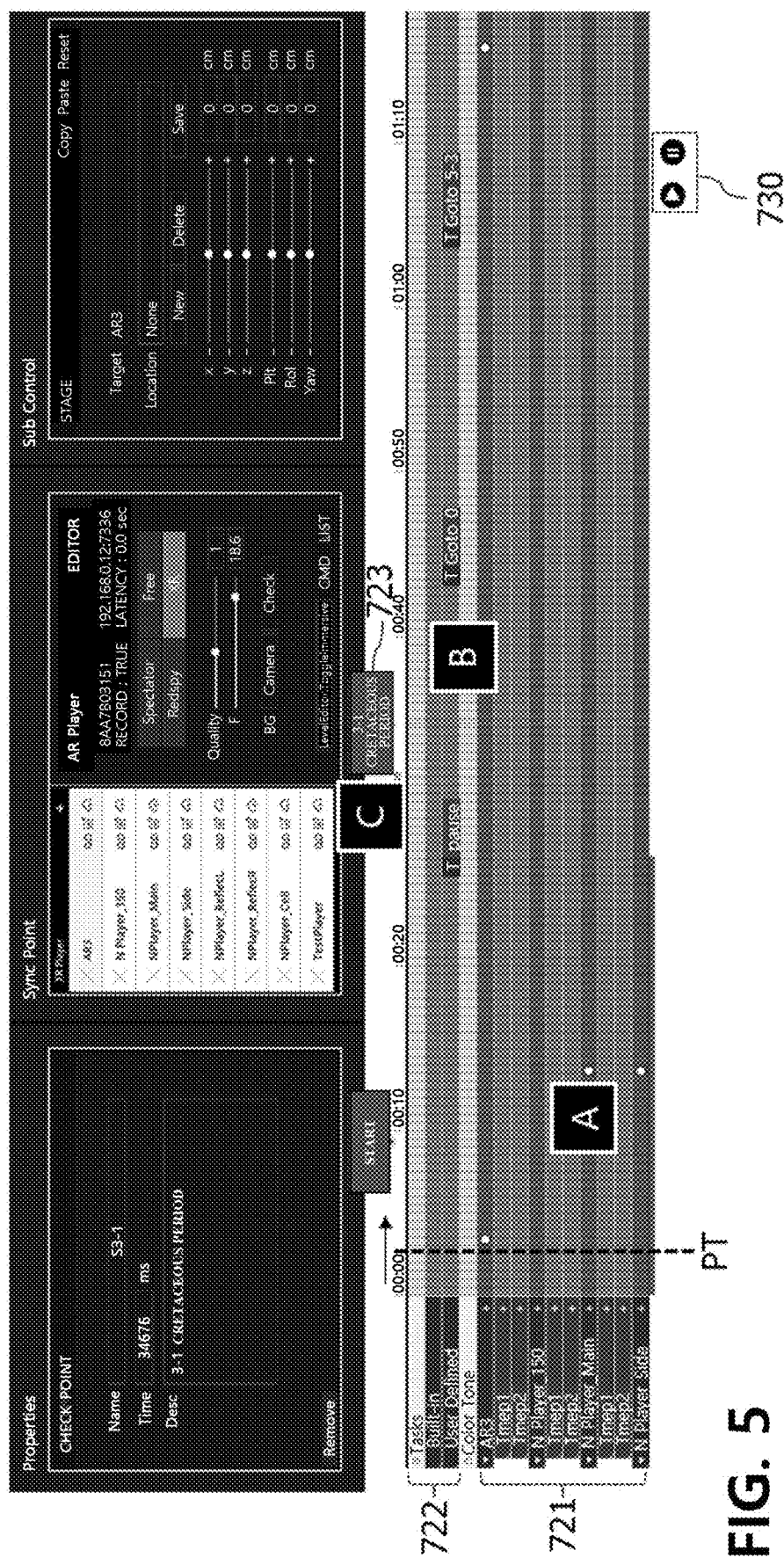
FIGS. 5 and 6 illustrate examples of a user interface (UI) of a control program displayed on a display (530).
Figure 6:
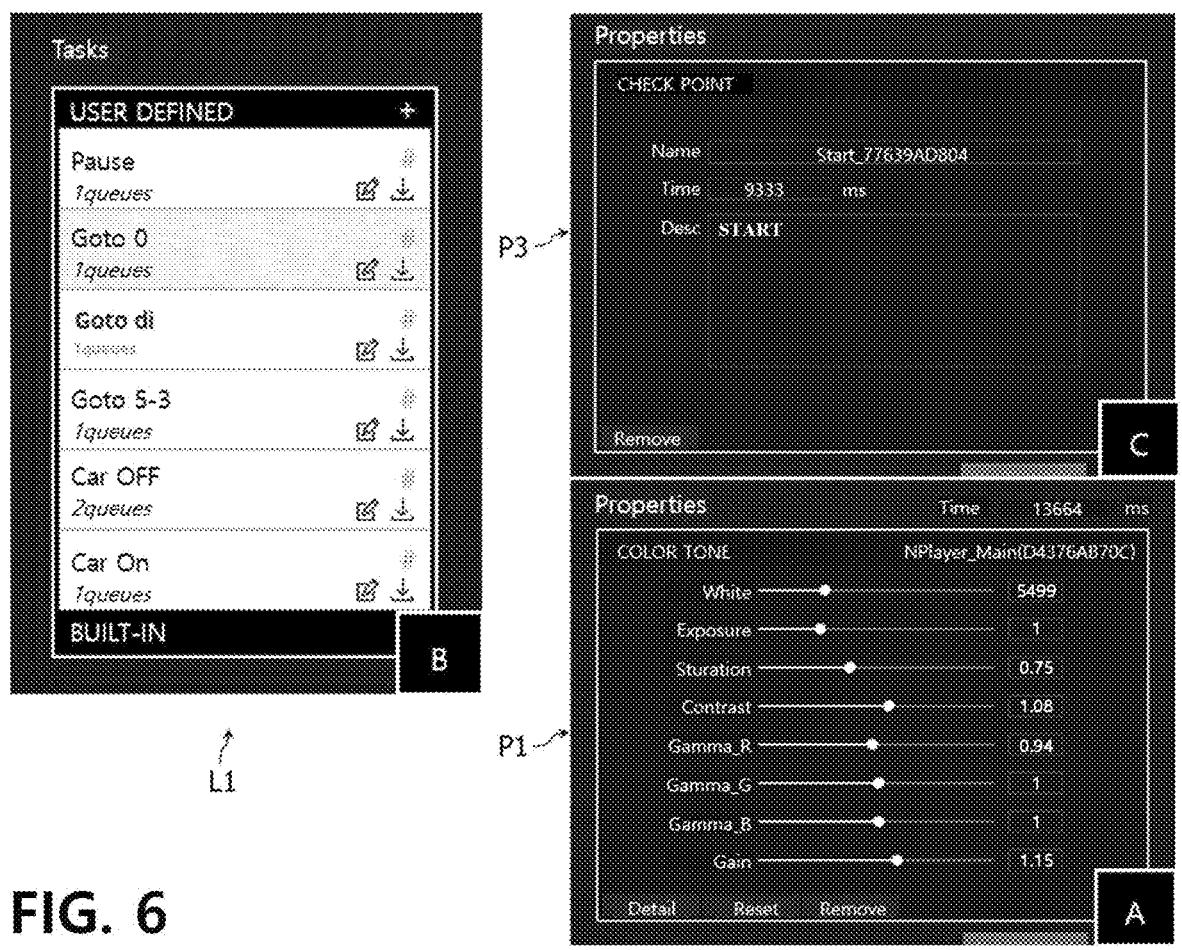
Figure 7:
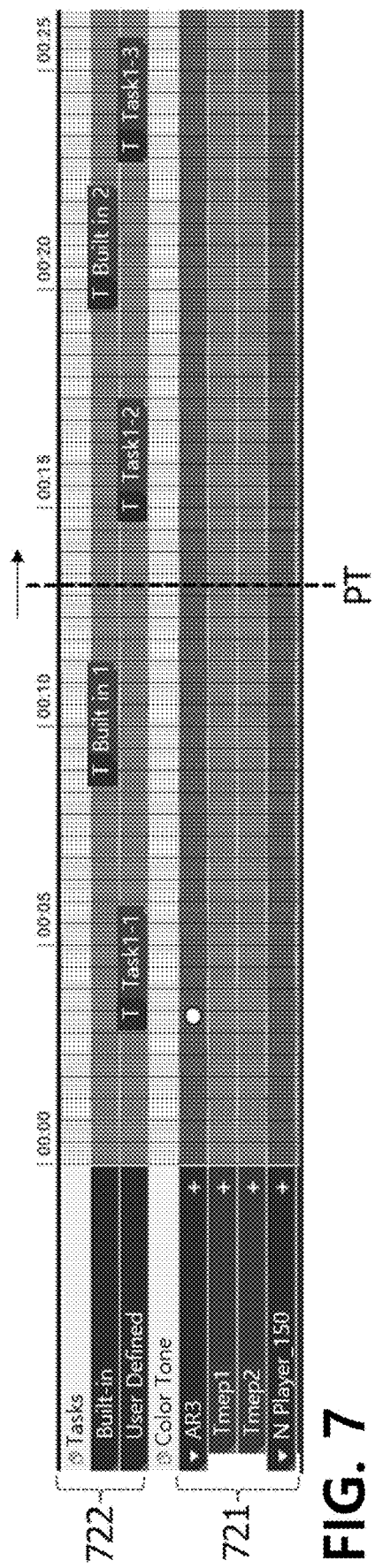
FIG. 7 illustrates another example in which the periphery of a second timeline (722) is further enlarged.
Figure 8:
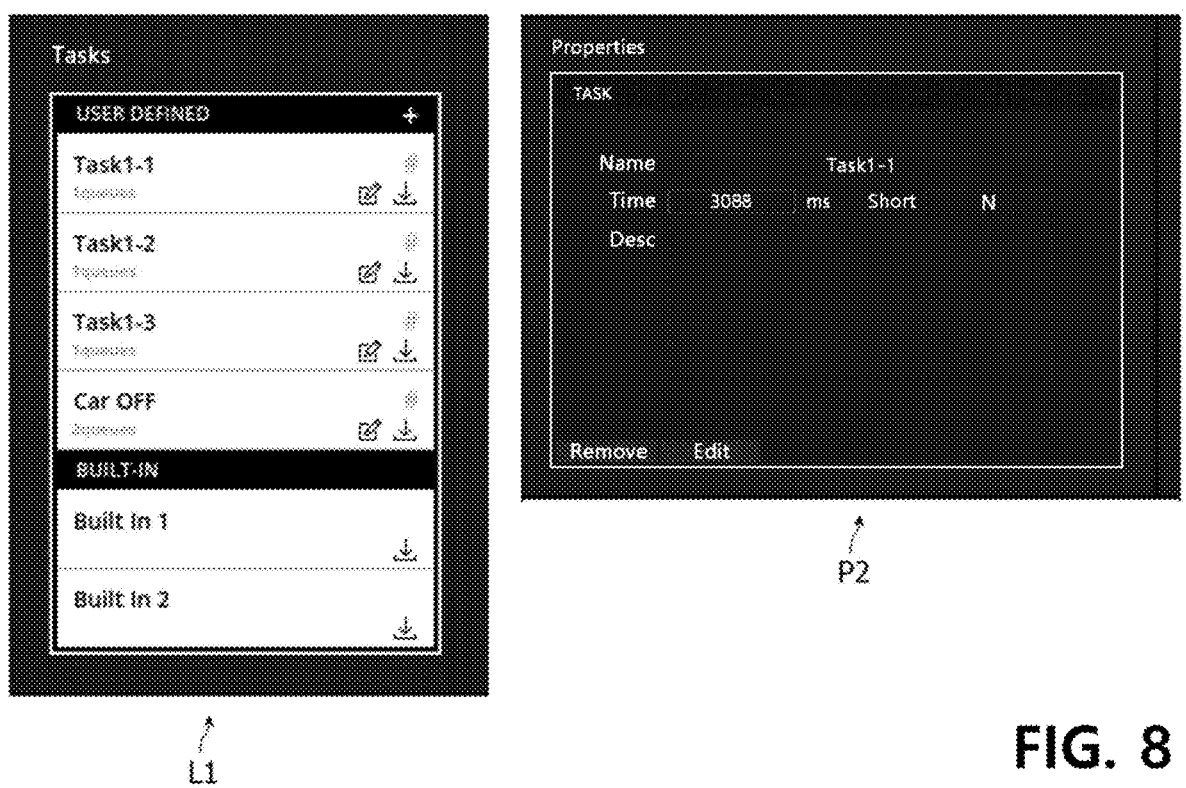
FIG. 8 illustrates a task list (L1) and a properties window (P2) for a specific task or task bundle which are related to FIG. 7.

FIG. 4 illustrates an example of a schematic configuration diagram of an operation of the control program, and FIGS. 5 and 6 illustrate examples of the UI of the control program displayed on the display 530. Further, FIG. 7 illustrates another example in which the periphery of a second timeline 722 is further enlarged, and FIG. 8 illustrates a task list L1 and a properties window P2 for a specific task or task bundle, which are related to FIG. 7.

Another example of the UI of the control program displayed on the display 530 is illustrated.

Meanwhile, referring to FIGS. 4 to 6, the execution of the operation of the control program is controlled through at least one processor of the control unit 550, the control program includes a connection object unit 710, a setting unit 720, and a playback operation unit 730, and the UI is displayed through the display 530.

The connection object unit 710 is a component that manages the connection of the external players 300, the special effect device 400, and the synthesizing device 600 based on a network, and is an object connected in one-to-one correspondence with each device. Of course, in FIG. 5 and the like, the connection object unit 710 is also expressed as "Sync Point."

That is, the connection object unit 710 is in charge of connection with the plurality of players 300 that respectively play different media. Accordingly, a plurality of connection object units 710 are provided to correspond to the number of the players 300.

In this case, the connection object unit 710 is provided to be in charge of each of the first and second players. In the case of the first player, a connection object unit 710, which is dedicated to each of the N player, the C player, and the M player, is provided. Further, when n N players are provided, n connection object units 710 in charge of a corresponding one of the N players are provided.

Accordingly, when the number of players 300 increases due to an increase in the number of required media, the number of connection object units 710 also increases according to the number of players 300. In this case, the connection object unit 710 may transmit and receive information on connection, state sharing, control signals, and the like with each player 300 through the plug-in installed in each player 300.

Of course, the connection object unit 710 may also be provided to be in charge of connection with each special effect device 400 and the synthesizing device 600. That is, each special effect device 400 may provide several general-purpose communication methods (e.g., transmission control protocol (TCP), user datagram protocol (UDP), serial, open sound control (OSC), and digital multiple x (DMX)) to enable control through a protocol supported by the corresponding device, and the connection object unit 710 may be connected to each special effect device 400 using a corresponding general-purpose communication method. Further, in the case of the synthesizing device 600, a timeline flow or an interaction event call is possible through a separate plug-in.

The configuration of each connection object unit 710 may be defined collectively in a connection manager. That is, various types of options defined on the timeline to be described below or commands generated from a task bundle are transmitted to the corresponding connection object unit 710 through the connection manager and the corresponding connection object unit 710 transmits the corresponding options and commands to the player 300 connected thereto, and thus the control of various types of operations according to the corresponding options and commands is reflected in the media played in the corresponding player 300.

The reason for connecting and managing each player 300, each special effect device 400, and the synthesizing device 600 through the dedicated connection object unit 710 is as follows.

(1) Ease of Use and Management

By defining several different types of devices with the same level concept of the connection object unit 710 and providing a similar interface, the user may understand and manage the structure easily and clearly (i.e., it is easy to establish a mental model). The respective connection object units 710 are displayed to be listed in the same way in the connection object list (sync point list) L1 of the UI, and when the user selects any one from among the respective connection object units 710, pieces of information and function buttons which are slightly different for each type (e.g., XR player, TCP, DMX, etc.) may be provided.

(2) Simplification of Internal Development Logic

By simplifying the connection with each player 300 so that the dedicated connection object unit 710 is in charge, and allowing special functions or characteristics to be defined as separate application programming interfaces (APIs) or variables, it can be simply expanded even when the type of connection object unit 710 is added or the number of functions is increased.

(3) Object in which the Characteristics of Individual Media are Stored

All of various settings or options (e.g., Internet protocol (IP)/port, color correction, quality, tracking correction value, current lens, etc.) of the media played in the player 300 are stored or managed in the connection object unit 710 dedicated to the corresponding player 300.

Meanwhile, the playback operation unit 730 is a component provided to the UI to manipulate whether to play the medium. That is, the playback operation unit 730 may include a playback button for performing a playback operation according to time information of first and second timelines 721 and 722, a stop button for stopping the corresponding playback operation, and the like. In this case, a playback target point PT indicating a current playback time is displayed across the first and second timelines 721 and 722. That is, when the playback button is clicked, the playback target point PT is moved to the right from the corresponding time along the time information of the first and second timelines 721 and 722 and the playback operation is performed. Further, when the stop button is clicked, the playback operation is stopped at the current playback time of the playback target point PT.

In particular, the control unit 550 may transmit various control settings set in the first and second timelines 721 and 722 and the current playback time of the playback target point PT to the corresponding player, the special effect device 400, or the synthesizing device 600 through the dedicated connection object unit 710, and perform time-series control thereof. That is, when the playback operation is performed according to an input to the playback button of the playback operation unit 730, each player 300, the special effect device 400, or the synthesizing device 600, which receives the corresponding information through the dedicated connection object unit 710, performs a time-series operation in which various control settings set in the first and second timelines 721 and 722 and the current playback time of the playback target point PT are reflected. Of course, a task that operates in the same way as the input to the playback button or stop button of the playback operation unit 730 or a task bundle including such a task may be added at any time point in the second timeline 722 to be described below.

Next, the setting unit 720 is a component which is provided to the UI for various settings. In particular, the setting unit 720 may be provided for an easy check of various settings for each player 300 and each task according to the user's input, manipulation of whether to play media, each setting according to media playback, and the current playback point. Referring to FIG. 5, the setting unit 720 includes a first timeline 721, a second timeline 722, and an annotation unit 723. Further, the setting unit 720 may include a first control setting unit, a second control setting unit, a third control setting unit, or the like.

The first timeline 721 is provided on the UI for an easy check of the settings of each player 300, each setting according to the playback operation, and the playback target point PT. In this case, one first timeline 721 is generated for each player 300 so as to be divided for each player 300. In particular, each first timeline 721 is displayed in the form of time-series layers (i.e., in the form in which a plurality of frames are arranged according to time), and each frame represents a setting portion for the corresponding player 300 that is applied only to a specific time in a sub-unit or is continuously applied from a specific time. That is, it is possible to set the corresponding player 300 in a specific frame according to the user's input. In this case, the types set in units of frames in the first timeline 721 include settings for color adjustment or settings for weather conditions.

For example, when looking at the periphery marked with "A" in FIG. 5, a key point (or key frame) in the form of a circle is added to a specific time frame portion of each of one N player (NPlayer_Main) and another N player (NPlayer_side). When the key point is added at any time point in the first timeline 721 of the corresponding player, it is possible to set the settings for color adjustment for the media played in the corresponding player or the settings for the weather conditions.

Figure 14:
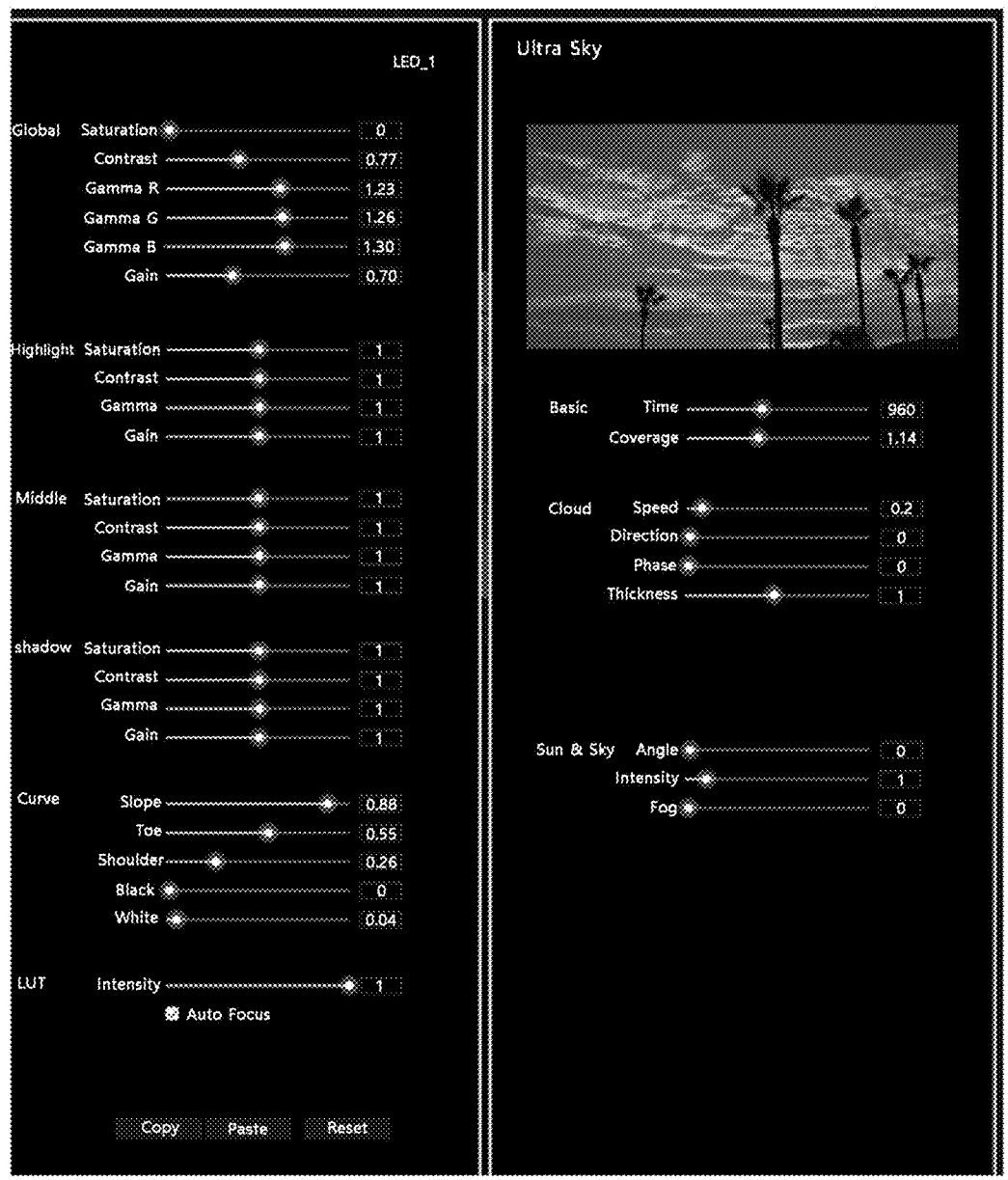

That is, through a properties window (also referred to as a "first control setting unit") P1 or P1' of FIG. 6 or 14 provided with the addition of the corresponding key point, it is possible to perform detailed settings for color adjustment that are applied only at a specific time in the frame or from the corresponding specific time for the medium played on the corresponding player. In this case, in the color adjustment setting, it is possible to change color elements such as hue, saturation, brightness, color temperature, color filter, and the like for the corresponding media.

Further, through the first control setting unit, weather conditions (sunny, overcast, rain, etc.) that are applied only at a specific time or are continuously applied from the corresponding specific time may be selected for the media played on the corresponding player. In this case, various color elements are preset to different values according to the weather conditions, and the preset values are applied according to the selection of the weather condition according to the user's input. For example, when the weather condition is "sunny," it may be preset to increase the brightness and the like of the corresponding media. In addition, various settings may be made on the first timeline 721 while adding the key point.

The control unit 550 transmits various control settings according to the key points and information on the current playback time of the first timeline to the corresponding player 300 through the dedicated connection object unit 710. Accordingly, the control unit 550 may control the corresponding player 300 to perform the time-series operation reflecting the corresponding control setting and the current playback time.

In particular, there are n players 300 that play media by taking charge of each of the n sub-unit displays 110 of the LED wall 100. The control unit 550 transmits various control settings according to the key point and the current playback time (common time) of the first timeline to the n corresponding players 300 through each dedicated connection object unit 710. Accordingly, the control unit 550 may control each medium of the n sub-unit displays 110 to be played according to the current playback time (common time) indicated by the playback target point PT to be synchronized, and also control the corresponding time-series operations to be performed.

The second timeline 722 is provided to the UI for an easy check of settings for each task, each setting according to the playback operation, and the playback target point PT. In particular, the second timeline 722 is displayed in the form of the time-series layers (i.e., in the form in which a plurality of frames are arranged according to time), and each frame represents a task setting portion that is applied only at a specific time in a sub-unit or is continuously applied from the specific time. That is, it may be set to call a specific task at the corresponding time of the specific frame of the second timeline 722. Of course, the first and second timelines 721 and 722 are time-series layers according to the same time information (time head).

In this case, the task is a caller distinguished in units of a single command. Further, a series of tasks are collected to form a task bundle. In particular, the tasks include a first task, which is a command for motion control of any special effect device 400, and a second task, which is a command for motion control of any player 300, according to the user's input. In addition, the tasks may include a command for calling the control program's own API, an external function call command, a command for delay, a command for changing or initializing a shared value, a command for calling another task bundle within a specific task bundle, and the like.

The first task may be a command for calling a control operation for a corresponding external environmental effect with respect to at least one of a light device, a lightning device, a sound device, a wind device, a fog machine, a snow machine, and a rain machine. That is, the first task may be a command for starting, adjusting the intensity of an effect, or stopping the corresponding external environmental effect.

The control unit 550 transmits the first task or task bundle including the first task set at any point in the second timeline 722 and the current playback time of the playback target point PT to the corresponding special effect device 400 through the dedicated connection object unit 710. Accordingly, the control unit 550 may control the operation (i.e., time-series operation) of the first task or task bundle including the first task at each corresponding time point to be performed.

The second task may be a command for a timeline or a command for calling an interaction event.

In this case, the control commands for the timeline may include a move command (also referred to "Goto") for the playback target point PT to move from any time point to another time point, a playback command (i.e., a command for performing the same operation as when a playback button is pushed, also referred to as "Play"), a stop command (i.e., a command for performing the same operation as when a stop button is pushed, also referred to as "Stop"), and the like. Further, the control commands for the timeline may include commands including a plurality of control operations, such as a "Go And Stop" command indicating a stop after a move and a "Go And Play" command indicating playback after a move.

Further, the interaction event call refers to calling a specific interaction defined in the content played in any player 300 (e.g., calling the appearance, change, or disappearance of a specific content). In particular, the N player or AR player is developed based on a real-time rendering method unlike general videos, and has the property of being able to freely adjust the state at any time similar to a game, and thus the interactive event call may be useful for integrated control of distributed media during broadcasting or performance.

For example, when it is assumed that a rain effect (event name Rain) or lightning effect (event name Lightning) is predefined on the content, the control program of the control unit 550 may start the corresponding effect at a desired time through an interaction call function.

In this case, when setting the interaction event call, it is possible to set various options such as the type, intensity, and frequency of the corresponding interaction in addition to a simple call (start/stop). For example, in the case of a rain effect, it is possible to set the intensity of the rain, and in the case of a lightning effect, it is possible to set the lightning intensity or duration.

The interaction may be freely defined by the producer of the content, and the corresponding effect should be defined equally for all players. In the control program of the control unit 550, an interaction event for several players may be called at the same time, and accordingly, several pieces of content constituting the display on the large LED wall 100 may visualize the same effect at the same time.

The control unit 550 transmits the second task or task bundle including the second task set at any point in the second timeline 722 and the connection object unit 710 dedicated to the current playback time of the playback target point PT to the corresponding player 300 or the synthesizing device 600 through the dedicated connection object unit 710. Accordingly, the control unit 550 may control the operation (i.e., time-series operation) of the second task or the task bundle including the second task at each corresponding time point to be performed.

Meanwhile, it is also possible to set up a call for the task bundle at any point in the second timeline 722. In this case, the task bundle is a concept of grouping tasks to be simultaneously called at a specific time into one unit. That is, the task bundle is a command for simultaneously calling a plurality of tasks selected from among the first task, the second task, and the remaining tasks.

The task bundle may be divided into a first task bundle provided by default in various types and a second task bundle newly defined by selecting a combination of the first and second tasks by the user.

In this case, the first task bundle is a predefined general-purpose task bundle, and includes several tasks, but user editing is not allowed. On the other hand, the second task bundle is a task bundle edited by the user by freely configuring the arrangement of various tasks.

When multiple players 300 are simultaneously controlled or a combination of the same tasks is repeatedly used several times, a function that can simply call by defining the same tasks as a single bundle is the task bundle. That is, through the task bundle, it is possible to simplify and process the repeated control of the player 300 and the calling of the plurality of tasks.

In particular, in order to author (generate) the second task bundle, it is necessary to define a combination of different types of commands or edit the order so that a consistent UI with a simple structure is provided. The reason why such a task bundle (in particular, the second task bundle) is needed is as follows, and the task bundle of the present invention may satisfy the corresponding reasons.

(1) There are Multiple Media (i.e., Players) that Need to be Controlled Simultaneously.

At the shooting site, various types of equipment such as a rendering server, synthesizing equipment, light equipment, a simulator, and sound are organically interlocked to form one scene. Therefore, in the case in which the control program is placed at the center and various types of media are connected and integrally controlled, when commands for all equipment are defined and called one by one, a control interface may become quite complicated and unnecessarily redundant tasks are repeated.

(2) There are Several Types of Commands that Need to be Executed at the Same Time.

In some cases, there are several commands that need to be executed regardless of the number of media. For example, when the playback target point PT reaches 03:00 in the first and second timelines, the playback target point PT is moved to 05:00, the AR player's explosion effect is executed, and then a series of commands that lower the AR player's main light device by 20% may need to be called simultaneously. As described above, an interface in which a series of simultaneous actions may be placed on the same line and a combination thereof may be defined is required.

(3) A Combination of the Same Tasks should be Able to be Repeatedly Used.

In the case of XR shooting, depending on the situation, it is often necessary to reproduce the previous production by moving around the timeline or to produce slightly different results depending on the specific situation. Therefore, it is very difficult to manually call several types of commands to be simultaneously called by newly designating the commands each time. That is, there is a need for an interface in which combinations of various tasks required during shooting are defined as a task bundle in advance and only the corresponding bundle is executed at a necessary time.

In particular, for a clearer distinction between the first and second task bundles, as illustrated in FIG. 5, the first and second task bundles may be divided into different second timelines 722 and displayed on the UI. That is, in FIG. 5, the second timeline 722 of "'Built-in" corresponds to a timeline of the first task bundle and the second timeline 722 of "'User Defined" corresponds to a timeline of the second task bundle.

For example, as illustrated in FIGS. 6 and 8, the types of applicable tasks or task bundles may be separately displayed on the UI through the task list L1. In this case, a specific task or task bundle selected from the task list L1 according to the user's input may be added to a point, which is desired by the user, in the second timeline, as illustrated in FIGS. 5 and 7. Of course, through a properties window P2 of FIG. 8, detailed settings (e.g., settings for detailed time points, etc.) for adjustments for added tasks or task bundles are possible.

Meanwhile, in order to widen the width of the application field, the task or task bundle may be called in various ways. Basically, the task or task bundle may be automatically called at a specific time point by adding a caller to the second timeline 722. Further, the specific task or task bundle may be executed in real time by clicking on an item in the task list L1 or by inputting a preset key from a keyboard or an external Musical Instrument Digital Interface (MIDI) device. Further, the specific task or task bundle may be remotely executed using a terminal or the like connected to the control device 500.

Figure 9:
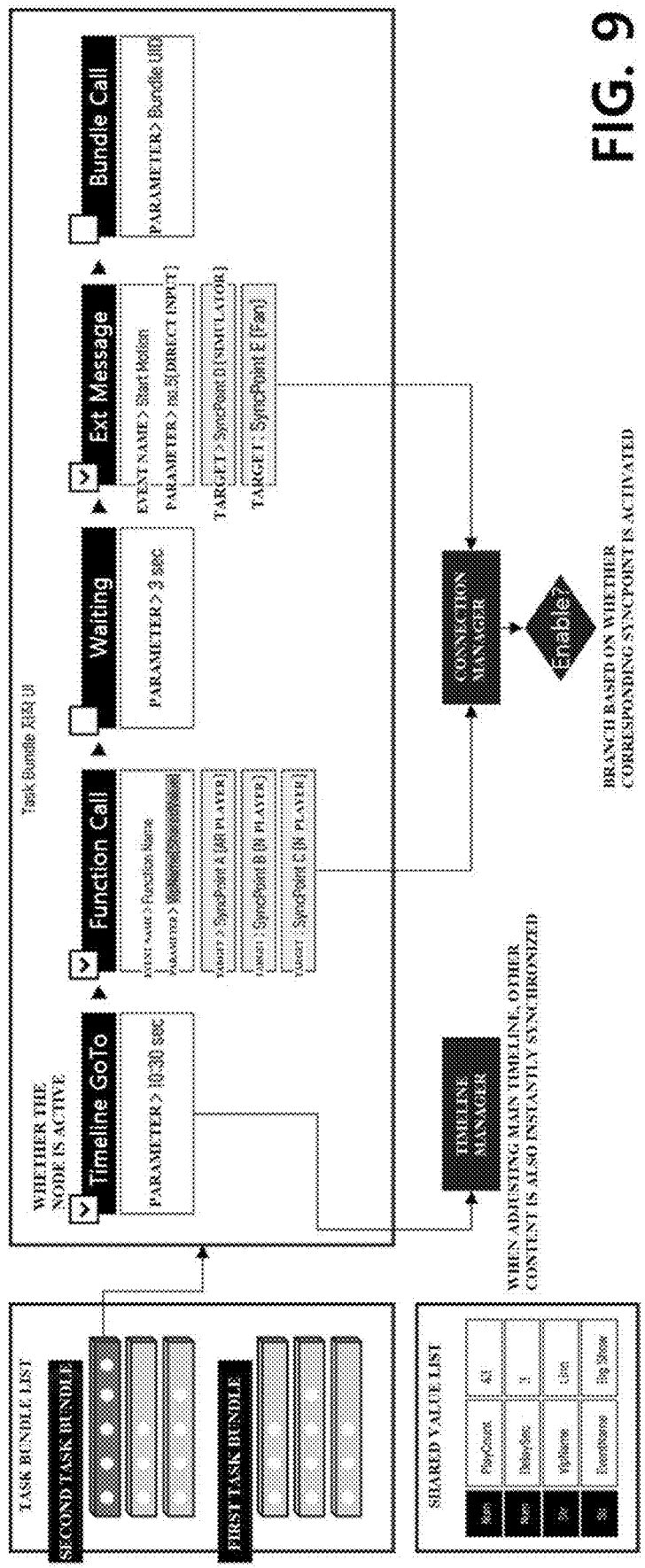
FIG. 9 illustrates an example of a process of authoring (generating) a second task bundle.
Figure 10:
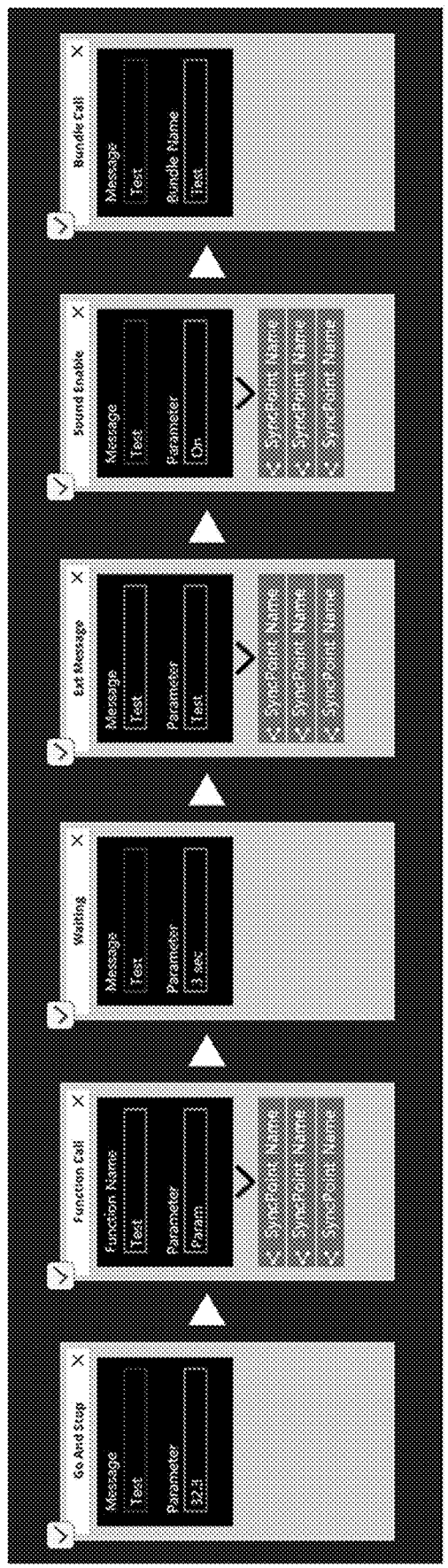
FIG. 10 illustrates an example of a UI provided for authoring (generating) a second task bundle.

FIG. 9 illustrates an example of a process of authoring (generating) a second task bundle, and FIG. 10 illustrates an example of a UI provided for authoring (generating) a second task bundle.

Meanwhile, in order to provide an interface for authoring the second task bundle, various commands are defined as a concept at the same level which is called a task. Further, it should be possible to edit a series of command flows in a simple manner through the authoring UI of the second task bundle. In this case, the method (keyboard, MIDI, timeline, etc.) in which the corresponding bundle is called may also be specifically defined.

In particular, the essence of task bundles is to simplify complex and repetitive processes. In order to generate the second task bundle, it is important to provide a simple information structure that is easy to understand and an intuitive interface. Accordingly, as illustrated in FIGS. 9 and 10, layers of information may be divided into two stages, namely a task and a second task bundle, and a linear node-based editing UI may be provided. Accordingly, the user may rapidly understand the flow of the event and reconfigure (add, delete, change order, etc.) nodes. In this case, each node may select whether to execute through a check box at the top left. Further, a basic structure of the node may be composed of a message, a parameter, and a target and may be displayed slightly differently according to the characteristics of the node.

Further, Shared Value is a kind of variable that can be used in the control program. For example, when the text (person's name, score, election result, etc.) to be displayed on the screen is changeable, a corresponding item may be generated in Share Value according to the user's input and a value of the corresponding item may be stored or changed. Further, the changed text may be displayed on the screen by transmitting the corresponding value to a visualization player developed with a game engine such as an N player, an AR player, or the like in real time. The reason for separately generating and managing Share Value in this way is that, unlike general videos, in the case of XR shooting, real-time rendering-based content that can change the expression or change the interaction result according to conditions is used. That is, the control program of the present invention for controlling content manages changeable options as Share Value and provides a function of manipulating the corresponding value (change value, initialization, etc.) through the task. Accordingly, flexible interaction control is possible.

Meanwhile, even when the task or task bundle is called and executed at any time point, the corresponding task or task bundle is an internally executed command in the control unit 550 of the control device 500, and thus it is difficult for the user to check whether the corresponding task or task bundle is normally executed. Therefore, when the specific task or task bundle is called and executed, whether the execution is completed may be displayed on a console window of a UI or the like. In particular, when the corresponding execution is completed, it is possible to help the user intuitively recognize the corresponding result by changing a specific color, shape, etc. of an item for the corresponding task or task bundle in the task list L1 (e.g., a red color is displayed for two seconds, etc.). In addition, result data according to whether the execution is completed may be stored in the memory 540 as a separate file.

Next, the annotation unit 723 is a component for displaying a speech bubble containing context information at any certain point in the first timeline 721 or the second timeline 722 in the UI, and may be displayed on the portion indicating the corresponding time point. For example, the annotation unit 723 may be displayed in the region in which the time information of the first and second timelines 721 and 722 is displayed. Accordingly, the user may more easily and intuitively classify various shooting regions.

Around portion C in FIG. 5, annotation units 723 such as "Start" and "3-1 Cretaceous Period" are displayed at the corresponding time point of the time information of the first and second timelines 721 and 722, respectively. In the annotation units 723 such as "Start" and the like, detailed settings for the annotation word, setting time, etc. are possible through the properties window P3 of FIG. 6.

The annotation unit 723 may be used as a time substitute when referring to specific points on the first and second timelines 721 and 722 in addition to the function of providing information. Accordingly, the annotation unit 723 may be used to move the playback target point PT.

That is, when any one annotation unit 723 is selected (e.g., clicked or the like) in the UI, the playback target point PT is moved to the time point of the corresponding annotation unit 723. For example, when the annotation unit 723 of "3-1 Cretaceous Period" is clicked, the playback target point PT at another time point is moved to a time point corresponding to the annotation unit 723 of "3-1 Cretaceous Period."

Further, a list of annotations (not illustrated) containing information on the annotation units 723 may be separately displayed on the UI. In this case, when information on any one annotation unit 723 is selected from the list of annotations, the playback target point PT is moved to the time point of the corresponding annotation unit 723. For example, when the annotation unit 723 of "Start" is selected from the list of annotations, the playback target point PT at another time point is moved to a time point corresponding to the annotation unit 723 of "Start."

In particular, the first task includes a move command Goto for moving the playback target point PT to a certain time point, and in the case in which a unique ID of any one annotation unit 723 is referenced when the move command Goto is called, the playback target point PT may be moved to a time point indicated by the annotation unit 723 having the corresponding unique ID.

For example, Goto (annotation unit ID) may be used instead of Goto (time). In this case, Goto (time) is a command to move the playback target point PT to the corresponding time, and Goto (annotation unit ID) is a command to move the playback target point PT to the time point of the annotation unit 723 having the corresponding ID. Accordingly, even when the content structure and time of the timeline are changed, it is possible to respond only by moving the time of the annotation unit 723 without additional modification of the task. That is, there is an advantage in that it is easy to edit when the content is changed.

Meanwhile, a specific example of the operation of the system 10 for a historical drama shooting (outdoor scene) in the In-Camera VFX method using the LED wall 100 will be described.

Figure 12:
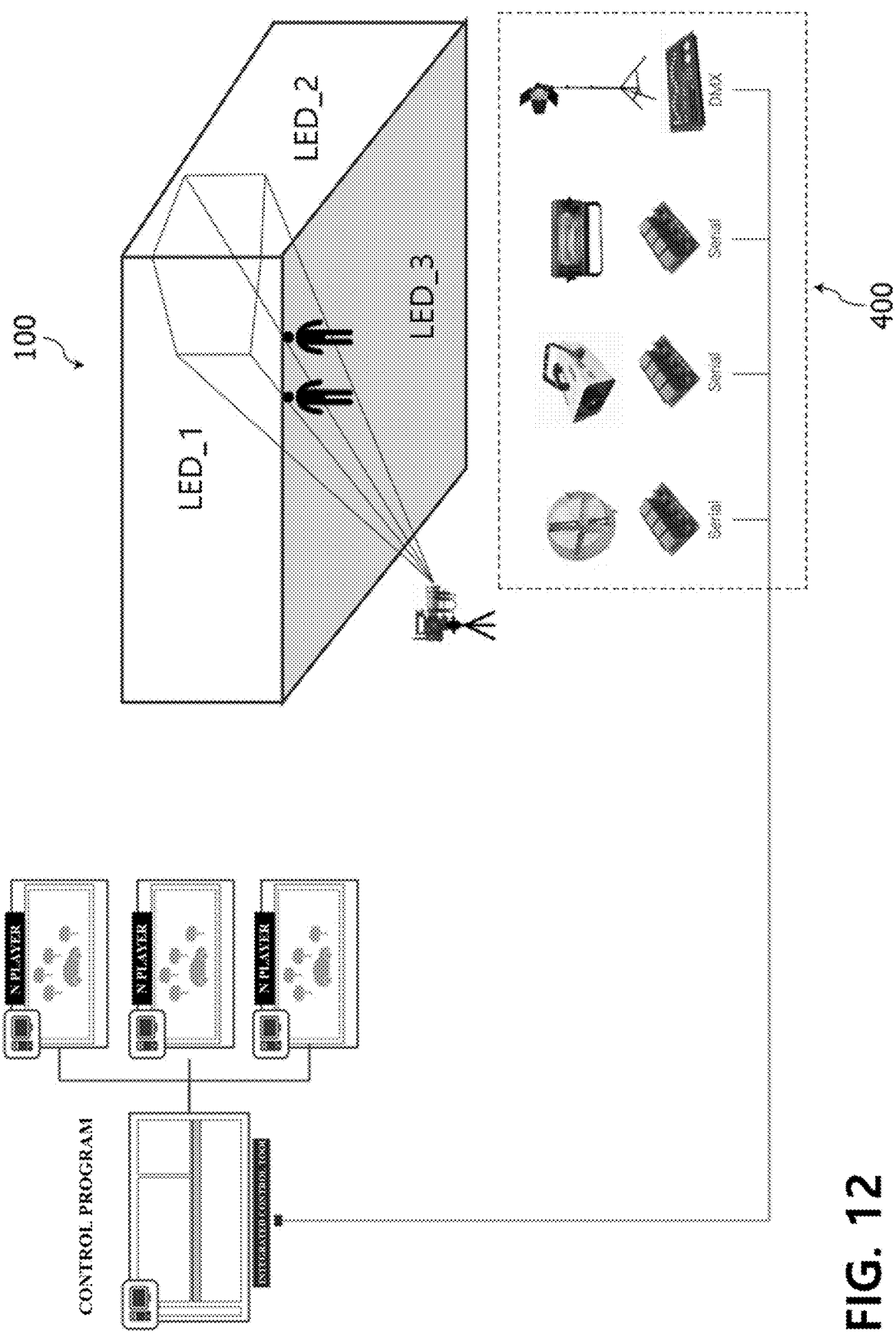
FIG. 12 illustrates an example of a system (10) for shooting a historical drama (outdoor scene).

FIG. 12 illustrates an example of the system 10 for shooting a historical drama (outdoor scene).

First, it is necessary to shoot scenes that starts with a clear sky in the background and gradually changes to bad weather with clouds and lightning as the play unfolds. For such shooting, as illustrated in FIG. 12, the LED wall 100 and three N players responsible for real-time rendering for three sub-unit displays 110 LED_1, LED_2, and LED_3 of the LED wall 100, respectively, are disposed.

Figure 13:
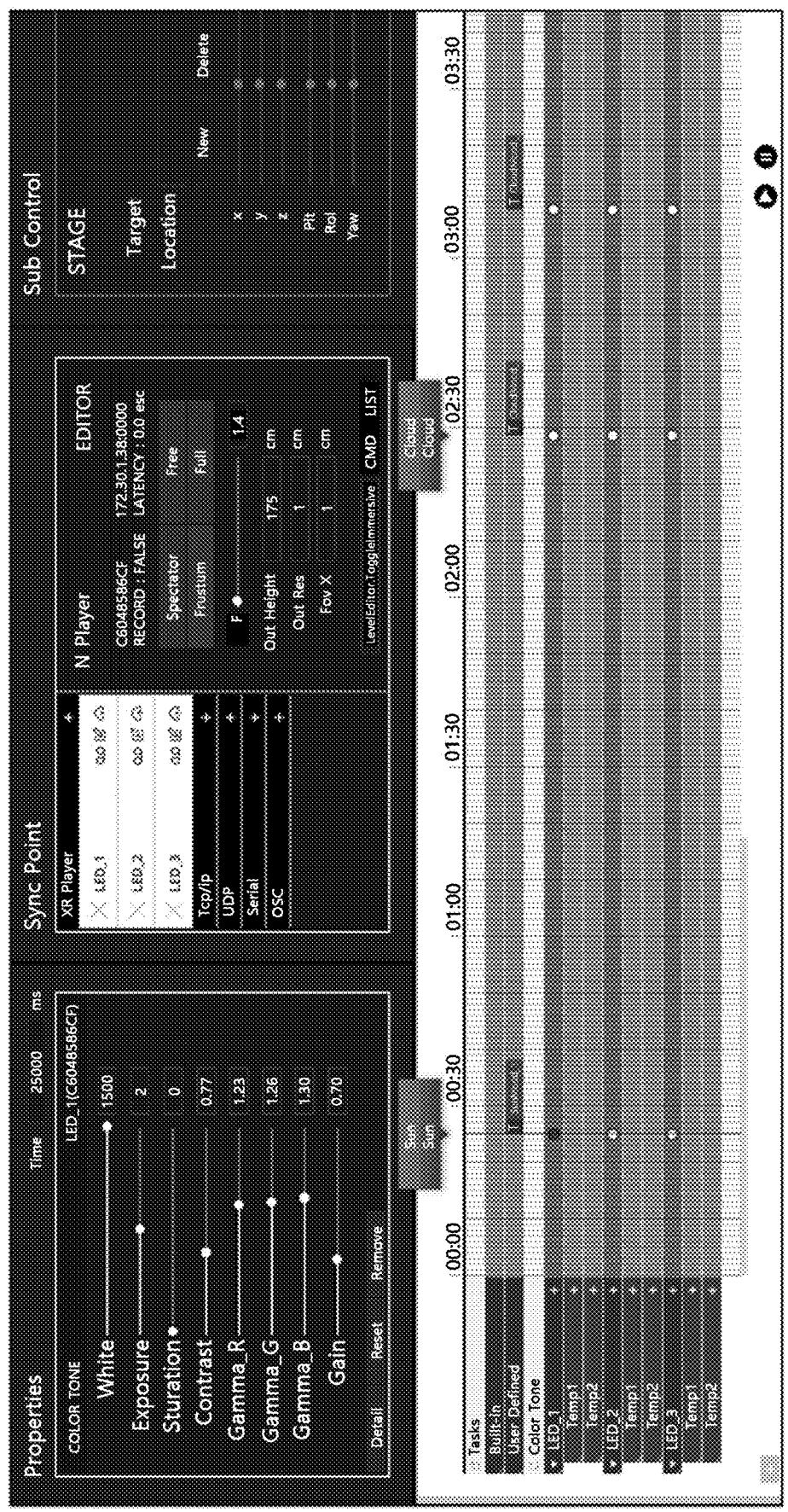
FIGS. 13 and 14 illustrate examples of setting of a control program in FIG. 12.
Figure 15:
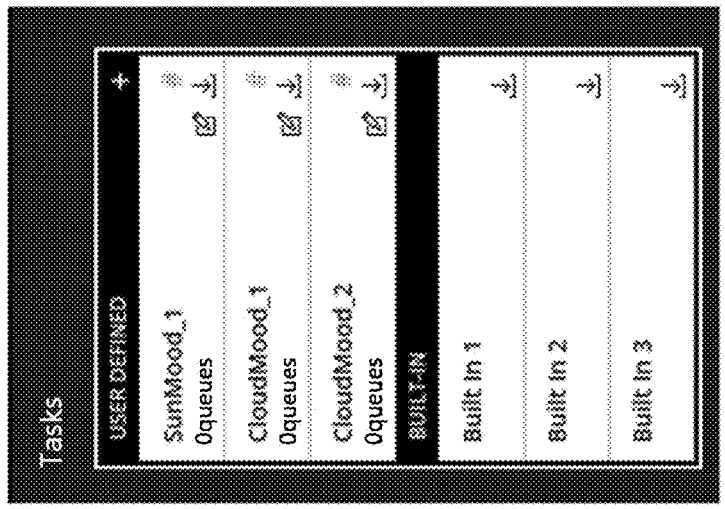
FIG. 15 illustrates an example of setting of a task bundle in FIG. 12.

FIGS. 13 and 14 illustrate examples of setting of the control program in FIG. 12, and FIG. 15 illustrates an example of setting of the task bundle in FIG. 12. In particular, FIG. 14 illustrates an example of the first control setting unit.

In order to express a change in background mood, first, the state of the media video displayed on the LED wall 100 should be changed from sunny weather to cloudy weather. Further, an interaction event in which lightning strikes at a specific time point should be called, and the special effect devices 400 such as a light device, a lightning device, a wind device, a fog machine, and the like should also be operated at the specific time point. To this end, the three N players responsible for the visualization of the LED wall 100 and the respective special effect devices 400 may be connected to the control program of the control unit 550 to be integrally controlled.

In order to change the state in the video displayed on the LED wall 100 over time, as illustrated in FIGS. 13 and 14, key points may be generated on the first timeline 721 at main time points such as sunny weather, cloudy weather, and the like, and thus it is possible to adjust the color of the video of the LED wall 100 and the state of the atmosphere (e.g., an amount/moving speed of clouds, a concentration of fog, a direction of the sun, etc.).

The set value of the input key point is immediately shared with the three N players through each dedicated connection object unit 710, and the video of the LED wall 100 is changed from a scene with sunny weather as a background to a cloudy and lightning strike atmosphere according to time when the time line of the control program is reproduced.

With the change of the video of the LED wall 100, when the special effect devices 400 such as a light device, a lightning device, a wind device, a fog machine, and the like are also simultaneously operated, the dramatic atmosphere may be directed more naturally. In the case of such directing, conventionally, it is common for separate personnel to control each device to manually operate according to the director's directing. However, in this conventional method, it is difficult to simultaneously operate the devices at a desired time and it is also difficult to operate the devices at the same time point as before when re-shooting.

Therefore, in the present invention, it is possible to control multiple devices to be simultaneously operated through the task bundle at one time by controlling each special effect device 400 through the control program and connecting the special effect devices 400 through the dedicated connection object unit 710.

To this end, a connection object unit 710 is generated for each special effect device 400 such as a light device, a lightning device, a wind device, a fog machine, or the like, and each connection method (protocol) is designated. For example, the light device may be mainly controlled through UDP-based Artnet, and most other devices may be controlled through serial communication.

In this way, the plurality of special effect devices 400 registered in the control program may be independently controlled by transmitting a desired signal or value. However, in order to express the directing at a specific time point, multiple special effect devices 400 may be controlled at one time by changing their respective operating states. Accordingly, three task bundles SunMood_1, SunMood_2, and SunMood_3 may be generated.

In this case, the task bundle SunMood_1 is a command for expressing sunny weather, and the task bundles CloudMood_1 and CloudMood_2 are commands for expressing different types of bad weather. The configuration of detailed commands included in each task bundle is as illustrated in FIG. 15.

For reference, in addition to the controlling of the above-described special effect devices 400, a dramatic effect may be added by calling a specific interaction defined in the N player. For example, interaction #1 may be an effect of blowing leaves on the content, and interaction #2 may be an effect of executing a thunder sound.

In this case, the above-described task bundle may be selected from the task bundle, which is provided by default, and generated or may be separately selected and generated by the user other than the default. The task bundle generated in this way may be placed at a key point where the state is changed on the second timeline of the control program so as to be automatically called according to time.

When the shooting starts, the timelines are simultaneously reproduced according to an input such as a playback button, and the content and the devices disposed on the shooting site may be integrally controlled at a determined time point by the key points and the task bundle, which are placed on the first and second timelines.

Of course, the time points or options (strength, frequency, etc.) to be called may be immediately changed and reflected in the control program according to the director's determination. In particular, there is a possibility of an unnecessary time difference or mistakes in the case of manual operation by several people as in the conventional method, but the method of the present invention automatically called by the timeline has an advantage of always providing the same shooting environment conditions.

Meanwhile, various settings which are executable in the control program will be additionally described.

<First Control Setting Unit>

First, the above-described first control setting unit such as P1 or P1' is an interface provided to the user to change a setting value of a key point added to the first timeline 721. Accordingly, through the first control setting unit, each key point added to the first timeline 721 may be selected and color adjustment or a weather (atmosphere) state (e.g., sun position, fog level, cloud amount) may be set differently. As described above, the set (changed) value for each key point defined in the time series is visualized through the corresponding player 300. That is, the key point data transmitted to the corresponding player 300 is again divided into time series and is displayed as a set value that is changed according to the progress of the timeline of the player 300 synchronized with the timeline of the control program.

The color adjustment or atmosphere state (sky, cloud, sun) are managed through the key point added to the timeline, and the key point data is stored in the connection object unit 710 responsible for a dedicated connection with each player 300. That is, when the specific player 300 accesses the connection object unit 710 of the control program, the setting value of all the key points for the corresponding player 300 is transmitted to the corresponding player 300 through network communication, and the configuration of the corresponding setting value is synchronized between the control program and the corresponding player 300. Thereafter, when the position of the key point is changed or when the setting value is modified, only the corresponding information is transmitted and reflected in the corresponding player 300 immediately after the change is completed.

For example, the key point data in the connection object unit 710 may be transmitted to a ColorTone manager through an external event class of the plug-in of the corresponding player 300. Here, the key point data converted according to the type of the player 300 again may be stored in a key list array. The application of the key point data may be reflected periodically by a timer set to 100 msec. For example, the setting value of a post-process may be changed with color correction information at the key point once every 0.1 seconds, and the information on the atmosphere state (sky, sun, cloud) may be changed in real time by being transmitted to an UltraSkyManager.

<Second Control Setting Unit>

Figure 16:
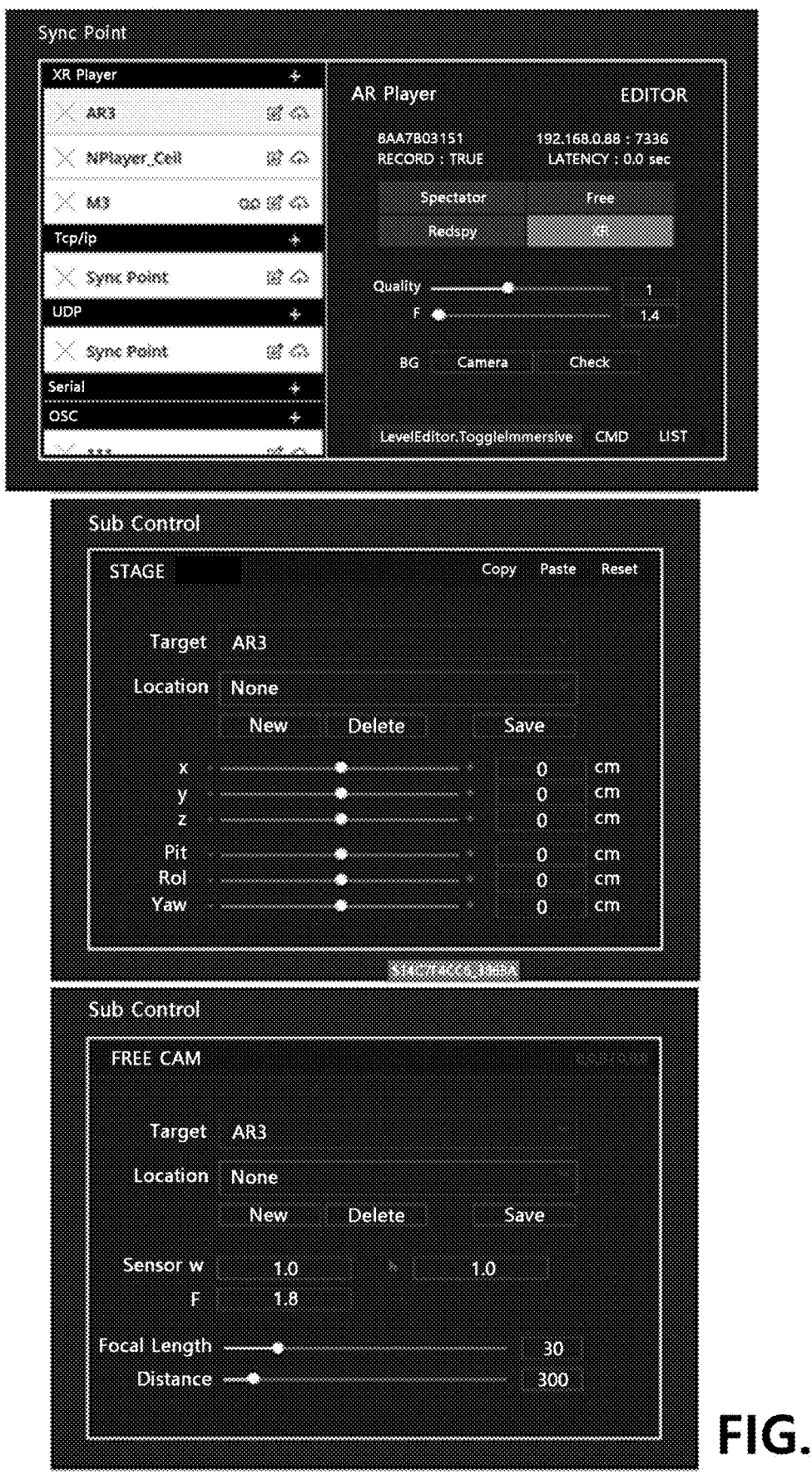
FIG. 16 illustrates an example of a second control setting unit.

FIG. 16 illustrates an example of the second control setting unit.

Next, referring to FIG. 16, the second control setting unit is an interface provided to the user to selectively interwork between the key points on the first timeline and the connection object unit or to set a specific state or mode of each connection object unit 710. Unlike the key points on the timeline, the values handled herein are not managed in time series. That is, the setting value in the second control setting unit may not be a value that is changed with the passage of time, but may be for a control setting that corrects position, angle, and lens information for a section played by each player. For example, in the case of the N player for In-Camera VFX shooting, the second control setting unit mainly deals with values that need to be set differently for each player according to the user's determination during shooting, such as player mode selection, frustum size, aperture value, motion blur intensity, and the like. Further, the second control setting unit may also provide a function of changing the current shooting position or direction of the tracking camera in real time in a virtual space through a Stage window and storing the value as a preset. Further, when a mode of a fixed camera called Free Cam is used, the second control setting unit may also be used for visualization purposes for the LED wall 100 for the reflector by changing the camera's gaze direction, position, sensor size, etc. in real time.

<Third Control Setting Unit>

Figure 17:
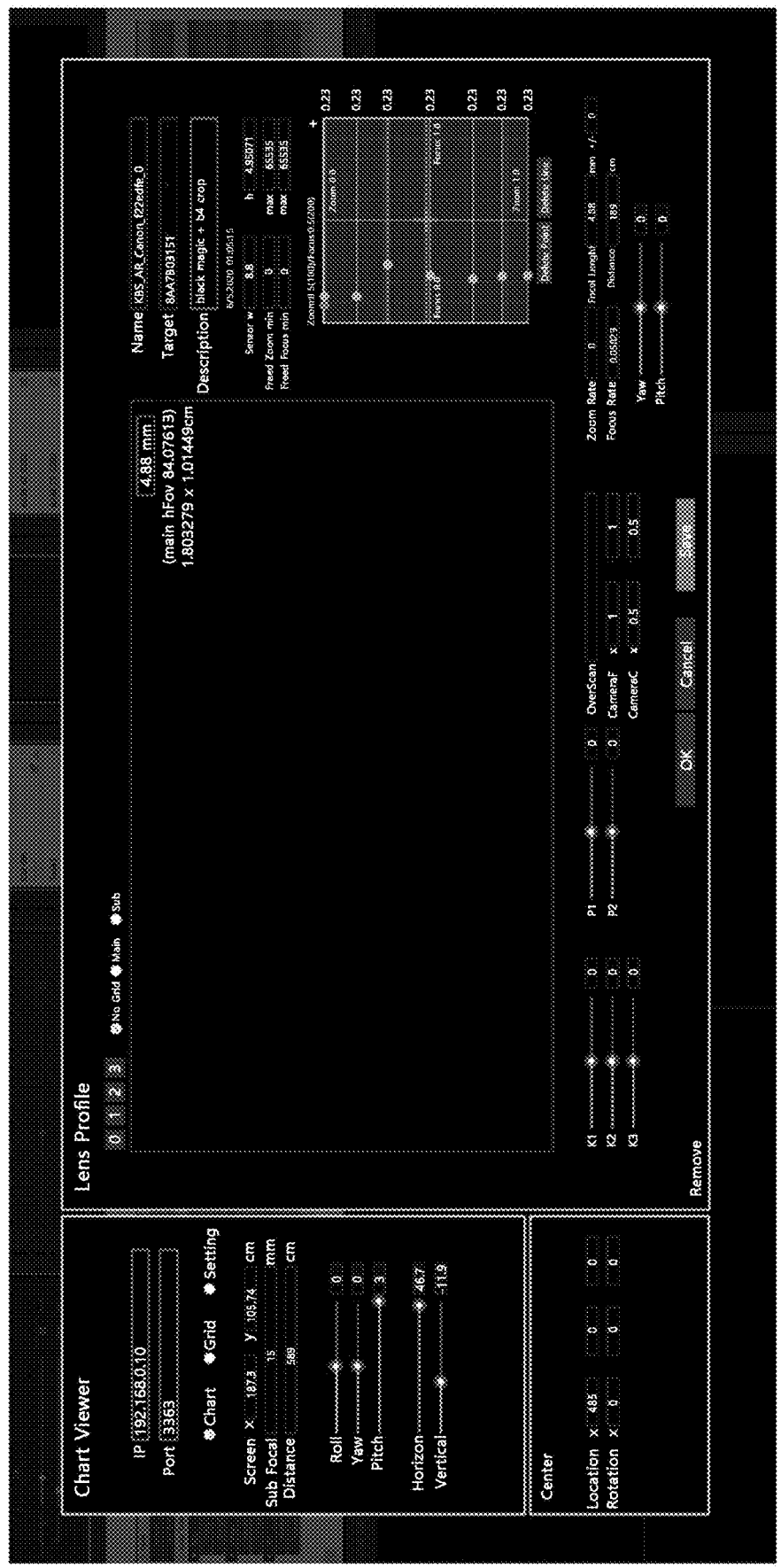
FIG. 17 illustrates an example of a third control setting unit.
Figure 18:
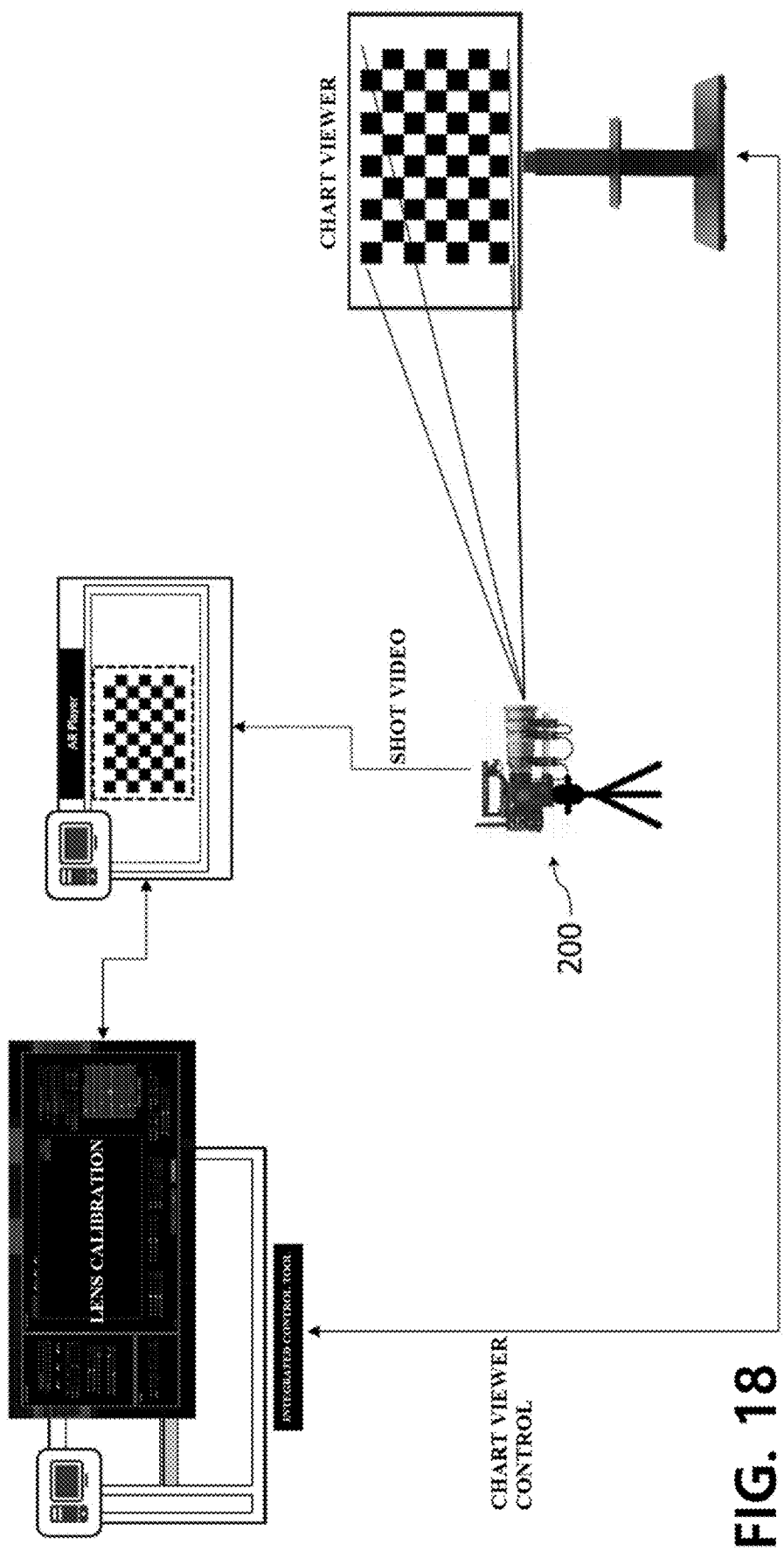
FIG. 18 illustrates an example of a process of lens calibration.

FIG. 17 illustrates an example of the third control setting unit, and FIG. 18 illustrates an example of a process of lens calibration.

Next, referring to FIG. 17, the third control setting unit provides an interface for lens calibration for synchronizing a physical lens and a virtual lens. That is, a basic function of virtual production is to transmit the position, angle, and lens information of the physical camera 200 moving in real space as game content through a tracking device and synchronize the information with VR graphics. To this end, it is necessary to adjust the information corresponding to the angle of view, focal length, distortion rate, etc. of the lens to be the same as the lens of the real camera 200. Accordingly, as illustrated in FIG. 18, a chart viewer program that displays a virtual chart, a lens calibration interface (third control setting unit), and an AR player are required. In the order of performing the calibration, a grid is displayed through the chart viewer program on a separate large display (e.g., large television (TV) or the like). When an actual size of the display, a distance between the camera sensors, and a desired angle of view are input to a calibration UI of the third control setting unit, a chart having a size corresponding to the angle of view is automatically drawn through the display. In this case, by matching the size of the grid drawn in the virtual space of the AR player and the size of the chart, it is possible to define an exact value of an angle of view. Further, by dividing a section within each angle of view, a focus setting point may be generated and a distance may be defined, and a weight of the angle of view may be assigned to each focal length. Further, a correction value capable of correcting lens distortion may be set for each focus set point.

Figure 11:
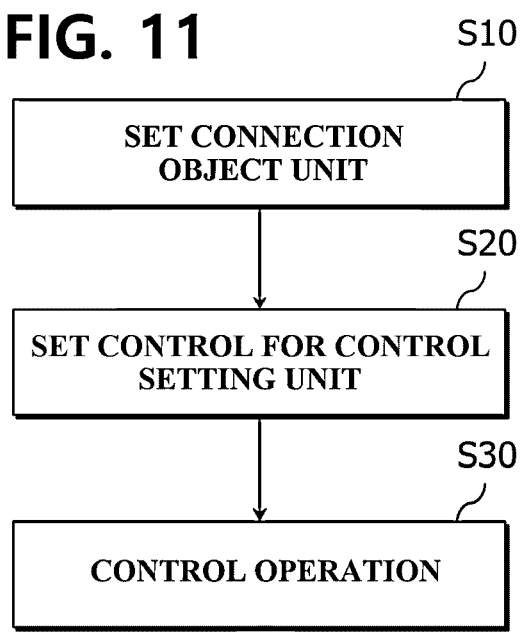
FIG. 11 illustrates a flowchart of operations of a control method according to an embodiment of the present invention.

FIG. 11 illustrates a flowchart of operations of a control method according to an embodiment of the present invention.

In the control method according to the embodiment of the present invention, the performance of operations of the control method may be controlled by the control unit 550 of the control device 500, and the control method includes operations S10 to S30, as illustrated in FIG. 11.

The operation S10 is an operation of setting, by the control unit 550, a plurality of connection object units 710 that are in charge of connection with a plurality of external players 300 that play different media. Of course, in operation S10, a connection object unit 710 dedicated to a special effect device 400 or synthesizing device 600 in addition to a player 300 may also be set. However, since the player 300, the special effect device 400, the synthesizing device 600, and the connection object unit 710 have already been described above, detailed descriptions thereof will be omitted below.

Thereafter, the operation S20 is an operation of performing control setting for the control setting unit. For example, in operation S20, the control unit 550 may perform time-series control setting (i.e., control setting for the first control setting unit) for each player 300 in first timelines 721 according to the user's input with respect to the plurality of first timelines 721 that are divided for each player 300 and displayed on an UI. Of course, in operation S20, time-series control setting for a second timeline 722 in addition to the first timelines 721 may also be performed. Further, in operation S20, other control settings for the first or second control setting unit in addition to the first control setting unit may be performed. However, since the first and second time lines 721 and 722, the time-series control settings for the first and second time lines 721 and 722, and the control settings for the first to third control setting units have already been described above, detailed descriptions thereof will be given below.

Thereafter, the operation S30 is an operation of controlling, by the control unit 550, time-series operations of the corresponding player 300 reflecting the corresponding control setting and the current playback time by transmitting the information on the control setting in S20 and the current playback time of the first and second timelines 721 and 722 to the corresponding player 300 through the dedicated connection object unit 710. Of course, in operation S30, a first task and a second task which are set at any time point of the second timeline 722, a task bundle including the first task or a task bundle including the second task, and a current playback time of the playback target point PT may be transmitted to the corresponding special effect device 400, the player 300, or the synthesizing device 600 through the dedicated connection object unit 710. In this case, the performance of the operations (i.e., the time-series operations) of the first task and the second task which are set at each corresponding time point, and the task bundle including the first task or the task bundle including the second task may be controlled. Further, in operation S30, the control unit 550 may control an operation according to the control setting of the first or second control setting unit in addition to the control setting of the first control setting unit. However, since the first and second tasks, the control setting, and the operation for the first and second tasks have already been described above, detailed descriptions thereof will be omitted below.

The above-described method may be loaded into a memory 540 and performed by executing a program under the control of the control unit 550. The program may be stored in the memory 540 of various types of non-transitory computer-readable media. The non-transitory computer-readable media include various types of tangible storage media.

For example, the non-transitory computer-readable media include a magnetic recording medium (e.g., flexible disk, magnetic tape, and hard disk drive), a magneto-optical recording medium (e.g., magneto-optical disk), a CD-ROM, a compact disc-recordable (CD-R), a compact disc-rewritable (CD-R/W), and a semiconductor memory (e.g., mask ROM, programmable ROM (PROM), erasable PROM (EPROM), flash ROM, RAM), but the present invention is not limited thereto.

Further, the program may be supplied by various types of transitory computer readable media. For example, the transitory computer readable media may include an electrical signal, an optical signal, and an electromagnetic wave, but the present invention is not limited thereto. That is, the transitory computer readable media may supply the program to the control unit 550 through a wired communication path such as an electric wire or optical fiber or a wireless communication path.

The present invention configured as described above may provide a timeline-based integrated directing control technique in which the segmented video shooting technology and separate equipment are effectively integrated for video shooting in virtual production and controlled in a consistent and simple manner. The present invention has the following main features.

(1) Synchronize and Control Flows Between Content

In the conventional case, since it is operated by receiving a fixed schedule or a simple control signal, a complex control function between the server and the player is not provided. On the other hand, in the case of XR shooting in which the virtual production technology is utilized, several different types of media content such as AR content, real-time content for LED walls, and general images are simultaneously displayed to compose a single scene. To this end, a plurality of rendering electronic devices (e.g., PC) for playing each medium type are used, and the present invention enables the rendering electronic devices to be integrally synchronized and controlled. In particular, even when the number of cameras increases or multiple players are used due to the large LED resolution, the present invention may provide a function for synchronizing the state between devices and controlling the content timeline equally. In particular, the present invention synchronizes the timelines of several players with the timeline of the control program and precisely and integrally controls the timelines at a desired time point at the millisecond ($\frac{1}{1000}^{th}$ of a second) level. Accordingly, components of the shooting site of the virtual production may be operated harmoniously and simultaneously and a series of scenarios may be shot seamlessly.

(2) Provision of Control Method in which Characteristics of Interactive Real-Time Content are Reflected In the case of XR content, like general video, time-series content is mainly focused on content that develops according to the passage of time. However, according to the characteristic of real-time rendering, it also has a game-like characteristic that can change specific content in real time at a desired time point. For example, it is possible to change the weather in the virtual space or call an explosion effect at a specific time point. Therefore, in addition to synchronizing and controlling the main timeline of each player, a function of calling a specific interaction event at a desired time is also required, and thus the present invention may provide such a function. In particular, in the present invention, with respect to the interaction event call, a command may be planted at a specific time point in the timeline to be called in time series or to be immediately executed manually through a keyboard, a MIDI device, or the like. Further, in the present invention, in the case of interaction control, it is possible to set much more various options, such as type, intensity, frequency, etc., rather than simple On/Off, unlike videos.

(3) Integrated Control Capability for Several Types of Devices

In XR shooting, several different types of devices should be simultaneously controlled to produce videos without bouncing or awkwardness. However, since there are many objects to be controlled and each type is different, it is not easy to manage the objects individually (connection, synchronization, status monitor, option change, flow control, etc.), and the process may become very complicated. Further, even when a video synthesis program, such as Pixotope, Disguise, or the like, other than the player that plays the media, should be used, equally sophisticated flow control should be possible. Further, when changing the graphic timeline (scene), effective shooting is possible only by simultaneously controlling the operations of special effect devices such as a light device, a lightning device, a sound device, a wind device, a fog machine, a snow machine, a rain machine, and the like. According to the present invention, several types of devices may be controlled easily, intuitively and integrally.

In the detailed description of the present invention, although the specific embodiments have been described, various modifications are possible without departing from the scope of the present invention. Therefore, the scope of the present invention is defined not by the described embodiment but by the appended claims, and encompasses equivalents that fall within the scope of the appended claims.

INDUSTRIAL APPLICABILITY

The present invention relates to a video shooting-related technique of virtual production and provides a virtual production-related technique that can be easily operated even by users lacking the knowledge required for virtual production by providing a user interface that can easily, intuitively, and integrally control a number of complex shooting elements at the shooting site in virtual production, and thus has industrial applicability.

The invention claimed is:

1. A device, which is a control device for video shooting in virtual production, in which a person or object located in front of a light-emitting diode (LED) wall is shot by a camera in a state in which at least one medium of media including an image, a video, or a camera tracking linked video is displayed in front of the LED wall, the device comprising:
   a display; and
   at least one processor configured to execute a program for controlling video shooting in virtual production and display a user interface of the program on the display,
   wherein the program includes a plurality of connection object units which are each dedicated to connection with a corresponding one of a plurality of external players that play different media, and a setting unit, which includes a plurality of first timelines which are divided for each external player and displayed in the form of time-series layers on the user interface, a first control setting unit for time-series control setting for each external player on the first timeline according to a user's input, and a second control setting unit for selectively interworking between a key point and the connection object unit on the first timeline or for control setting of a detailed state or mode of the connection object unit, and
   the at least one processor transmits information on the control setting and a current playback time of the first timeline to the corresponding external player through the dedicated connection object unit and controls time-series operations of the plurality of external players in which the control setting and the current playback time are reflected.

2. The device of claim 1, wherein the control setting of the first control setting unit includes color adjustment setting or weather condition setting for the medium played in any player at any time point on the first timeline according to the user's input.

3. The device of claim 1, wherein the plurality of players includes individual players that segment the medium displayed on the LED wall into n sections and play the medium according to a control signal,
   wherein n is a natural number greater than or equal to two.

4. The device of claim 3, wherein the second control setting unit is allowed to perform control setting for correcting position, angle, and lens information on the section played by each player.

5. The device of claim 4, wherein the control signal includes a control value for visualizing a frustum, which is a portion included in a lens of a real camera, at a higher resolution than another region by projecting a position, an angle of view, and a focal length of the real camera onto a virtual camera.

6. The device of claim 5, wherein the control value includes a check value indicating whether the player is connected, a key value of data of a lens connected to the player, a position value and direction value of a fixed camera, and a correction value of tracking data.

7. The device of claim 3, wherein:
   the setting unit includes the n first timelines for each of the n players that segment the medium into the n sections and play the medium; and
   the at least one processor synchronizes and plays the media of the n sections played according to the time of the n first timelines.

8. The device of claim 3, wherein the plurality of players further includes a player that synthesizes or expands augmented reality (AR) interlocked according to camera tracking with a video shot by the corresponding camera.

9. The device of claim 1, wherein:
   the plurality of connection object units are each provided to be dedicated to connection with a corresponding one of a plurality of external special effect devices supporting external environmental factors;
   the setting unit further includes second timelines displayed in the form of time-series layers on the user interface so as to perform call setting at any time point for a first task, which is a command for controlling an operation of any special effect device, according to the user's input; and
   the at least one processor transmits the call setting to the corresponding special effect device through the dedicated connection object unit and controls an operation of the first task at the corresponding time point.

10. The device of claim 9, wherein the special effect device includes at least one of a light device, a lightning device, a sound device, a wind device, a fog machine, a snow machine, or a rain machine.

11. The device of claim 9, wherein:
   the setting unit is allowed to perform call setting of a second task, which is a command for controlling an operation of any player, at any time point on the second timeline according to the user's input; and
   the at least one processor transmits the call setting of the second task to the corresponding player through the dedicated connection object unit and controls an operation of the second task at the corresponding time point.

12. The device of claim 11, wherein:
   the setting unit is allowed to perform call setting of a task bundle at any time point on the second timeline according to the user's input; and the task bundle is a command for simultaneously calling a plurality of tasks selected from among the first and second tasks.

13. The device of claim 12, wherein the task bundle is a first task bundle, which is provided by default in various types, or a second task bundle, which is newly defined by selecting a combination of the first and second tasks from among the first and second tasks by the user.

14. The device of claim 13, wherein the first and second task bundles are displayed on the user interface according to the different second timelines.

15. The device of claim 12, wherein, when the task bundle is executed, whether the execution has been completed is separately displayed on the user interface.

16. The device of claim 9, wherein the setting unit further includes an annotation unit in which a speech bubble containing situation information for any time point on the first timeline or the second timeline is displayed on a portion of the user interface which indicates the corresponding time point.

17. The device of claim 16, wherein:
the user interface displays a list of annotations containing information on the annotation unit; and
when information on any one annotation unit is selected from the list of annotations, a playback target point in the setting unit is moved to a time point of the corresponding annotation unit.

18. The device of claim 16, wherein:
the first task includes a move command for moving the playback target point in the setting unit to any time point; and
when a unique identification (ID) of any one annotation unit is referred to when the move command is called, the playback target point in the setting unit is moved to a time point indicated by the annotation unit of the corresponding unique ID.

19. A system, which is a system for video shooting in virtual production, the system comprising:
a light-emitting diode (LED) wall on which at least one medium of media including an image, a video, or a camera tracking linked video is displayed in front thereof;
a camera configured to shoot a person or object located in front of the LED wall in a state in which the at least one medium is displayed on the LED wall; and
a control device configured to control playback of the medium,
wherein the control device executes a program for controlling video shooting in virtual production and controls a user interface of the program to be displayed on a display,
the program includes a plurality of connection object units which are each dedicated to connection with a corresponding one of a plurality of external players that play different media, and a setting unit, which includes a plurality of first timelines which are divided for each external player and displayed in the form of time-series layers on the user interface, a first control setting unit for time-series control setting for each external player on the first timeline according to a user's input, and a second control setting unit for selectively interworking between a key point and the connection object unit on the first timeline or for control setting of a detailed state or mode of the connection object unit, and
the control device transmits the control setting to the corresponding player through the dedicated connection object unit and controls time-series operations of the plurality of players according to the control setting.

20. A method, which is a method performed in a device for video shooting in virtual production, in which a person or object located in front of a light-emitting diode (LED) wall is shot by a camera in a state in which at least one medium of media including an image, a video, and a camera tracking linked video, is displayed in front of the LED wall, the method comprising:
setting a plurality of connection object units which are each dedicated to connection with a corresponding one of a plurality of external players that play different media;
performing control setting for time-series control setting for each external player on the first timeline according to a user's input on a plurality of first timelines which are divided for each external player and displayed in the form of time-series layers on a user interface and performing control setting for selectively interworking between a key point and the connection object unit on the first timeline or control setting of a detailed state or mode of the connection object unit; and
transmitting information on the control setting and a current playback time of the first timeline to the corresponding player through the dedicated connection object unit and controlling time-series operations of the plurality of players in which the control setting and the current playback time are reflected.

* * * * *